(12) United States Patent
Asmussen et al.

(10) Patent No.: US 7,442,271 B2
(45) Date of Patent: Oct. 28, 2008

(54) MINIATURE MICROWAVE PLASMA TORCH APPLICATION AND METHOD OF USE THEREOF

(75) Inventors: Jes Asmussen, East Lansing, MI (US);
Timothy Grotjohn, Okemos, MI (US);
Shengxi Zuo, East Lansing, MI (US);
Kadek W. Hemawan, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 473 days.

(21) Appl. No.: 11/100,253

(22) Filed: Apr. 6, 2005

(65) Prior Publication Data

US 2005/0223992 A1  Oct. 13, 2005

Related U.S. Application Data

(60) Provisional application No. 60/560,145, filed on Apr. 7, 2004.

(51) Int. Cl.
*C23F 1/00* (2006.01)
*H01L 21/306* (2006.01)
*B23K 1/00* (2006.01)
*B23K 3/00* (2006.01)

(52) U.S. Cl. .................. 156/345.41; 118/723 MW; 118/723 ME; 228/51

(58) Field of Classification Search ............ 219/121.48; 118/723 MW, 723 ME, 723 MR, 723 MA; 156/345.36, 345.41–345.42
See application file for complete search history.

(56) References Cited

U.S. PATENT DOCUMENTS

| | | | |
|---|---|---|---|
| 4,611,108 A | 9/1986 | Leprince et al. | |
| 5,734,143 A | * 3/1998 | Kawase et al. | ......... 219/121.43 |
| 6,184,982 B1 | 2/2001 | Karanassios | |
| 6,213,049 B1 | 4/2001 | Yang | |
| 6,218,640 B1 | 4/2001 | Selitser | |
| 6,397,776 B1 | 6/2002 | Yang et al. | |
| 6,759,808 B2 | 7/2004 | Grotjohn et al. | |

OTHER PUBLICATIONS

J. Asmussen, Electron cyclotron resonance microwave discharges for etching and thin-film deposition, J. Vac. Sci. Technol. A, vol. 7, pp. 883-893 (1989).

J. Asmussen, J. Hopwood, and F.C. Sze, "A 915MHz/2.45 GHz ECR plasma source for large area ion beam and plasma processing," Rev. Sci. Inst., vol. 6 pp. 250-252 (1990).

J. Asmussen, T. Grotjohn, P. Mak and M. Perrin, "The design and application of electron cyclotron resonance discharges," Invited Paper for the 25th annivrsary edition of the IEEE Trans. on Plasma Science, 25, 1196-1221 (1997).

(Continued)

*Primary Examiner*—Rudy Zervigon
(74) *Attorney, Agent, or Firm*—Ian C. McLeod

(57) ABSTRACT

A miniature microwave plasma torch apparatus (10) is described. The microwave plasma torch apparatus (10) is used for a variety of applications where rapid heating of a small amount of material is needed. The miniature microwave plasma torch apparatus (10) operates near or at atmospheric pressure for use in materials processing. The apparatus (10) provides a wide range of flow rates so that discharge properties vary from diffusional flow of radicals for gentle surface processing to high velocity, approaching supersonic, torch discharges for cutting and welding applications. The miniature microwave plasma torch apparatus (10) also has a very small materials processing spot size.

19 Claims, 28 Drawing Sheets

OTHER PUBLICATIONS

T.A. Grotjohn, A. Wijaya and J. Asmussen, Microwave Microstripline Circuits for the Creation and Maintenance of Mino and Micro Microwave Discharges, US Patent Pending. Now U.S. Patent No. 6,759,808.

T.A. Grotjohn, J. Asmussen and J. Narendra, "Microstripline applicator for generating microwave plasma discharges," 2003 NSF Design, Manufacturing and Industrial Innovation Conference Proceedings, Birmingham, AL 2003.

J. Hopwood, D.K. Reinhard and J. Asmussen, "Experimental conditions for uniform anisotropic etching of silicon with a microwave electron cyclotron resonance plasma system," J. Vac. Sci, Technol. B., vol. 6 1896-1899 (1988).

J. Hopwood, D.K. Reinhard and J. Asmussen, "Charged particle densities and energy distributions in a multipolar electron cyclotron resonant plasma etching source," J. Vac. Sci. Technol. A, vol. 8, pp. 3103-3112 (1990).

G. King, F.C. Sze, P. Mak, T.A. Grotjohn and J. Asmussen "Ion and neutral energies in a multipolar electron cyclotron resonance plasma source," J. Vac. Sci. Technol. A., vol. 10, pp. 1265-1269 (1992).

P. Mak, G. King, T.A. Grotjohn, and J. Asmussen, "Investigation of the influence of electromagnetic excitation on electron cyclotron resonance discharge properties," J. Vac. Sci. Technol. A., vol. 10, pp. 1281-1287 (1992).

S. Whitehair, J. Asmussen and S. Nakanishi, "Microwave electrothermal thruster performance in helium gas," J. of Propulsion and Power, vol. 3, pp. 136-144 (1987).

* cited by examiner

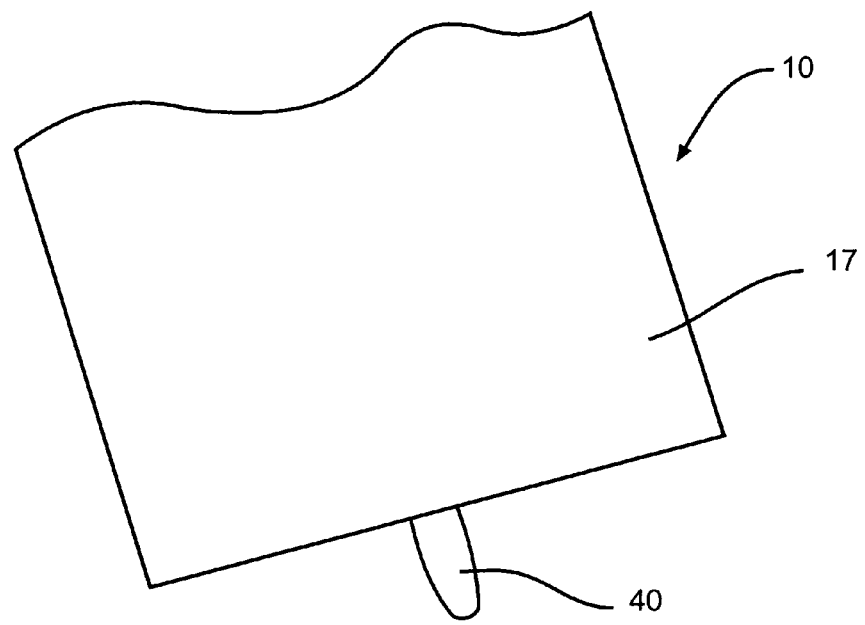
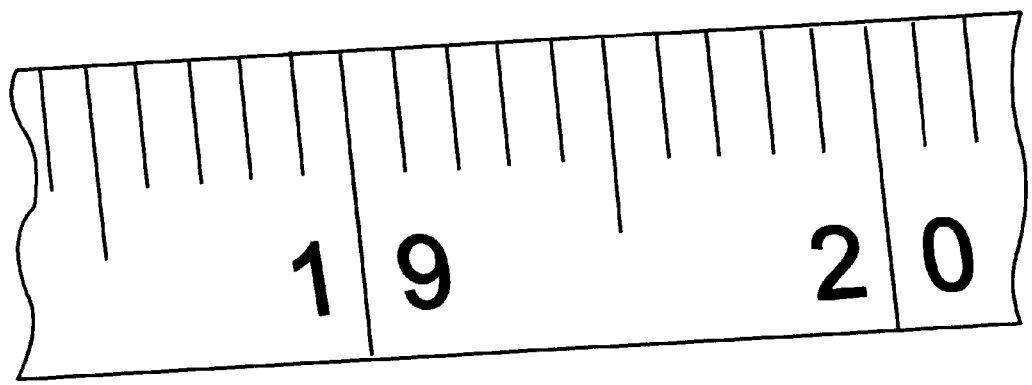
Each ruler mark is a mm
FIG. 4

- Power absorbed in the applicator and discharge was 30 W (except at 700 sccm the power absorbed was 37W)
- The discharge diameter was estimated to be 400-700 mm in diameter

- Power densities are calculated assuming all the power absorbed in the applicator/discharge structure goes to the discharge
- Discharge diameter is assumed to be 700 mm

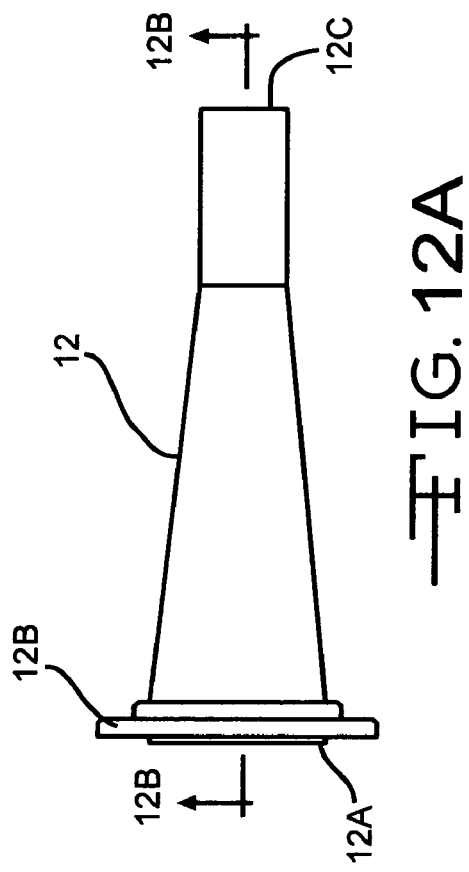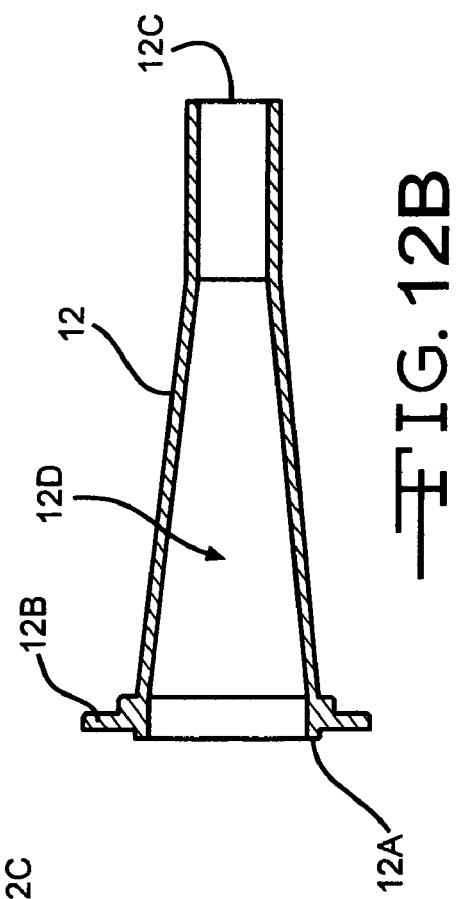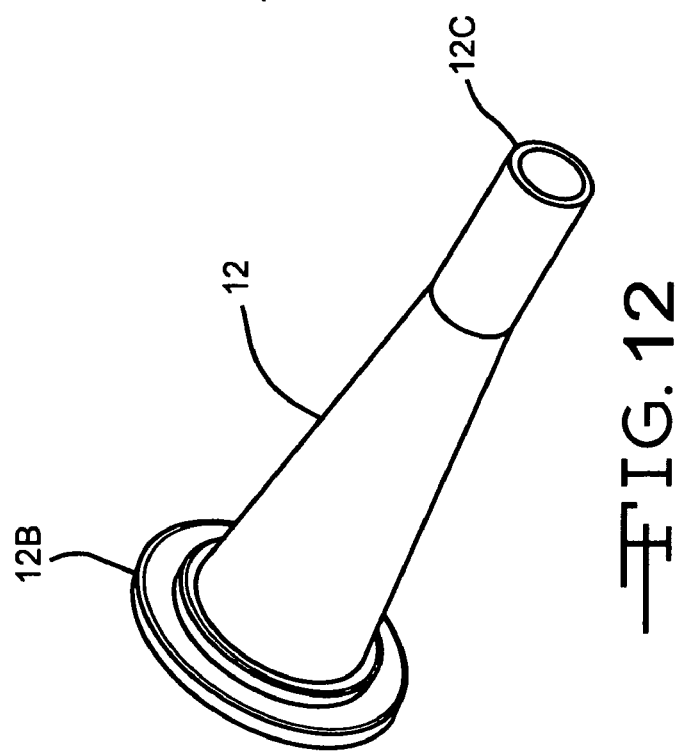

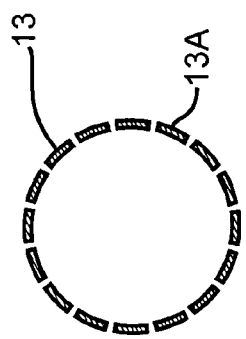
FIG. 13C
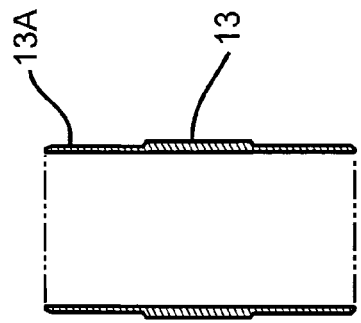
FIG. 13D
FIG. 13A
FIG. 13B
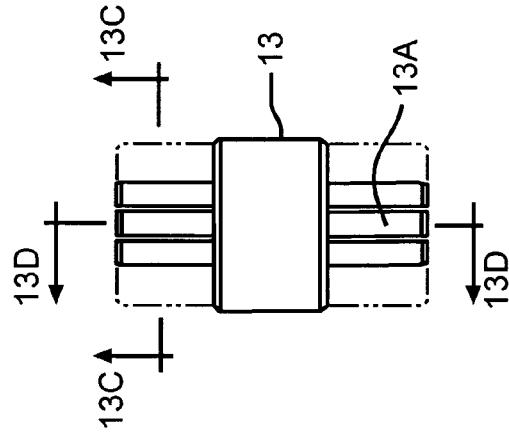
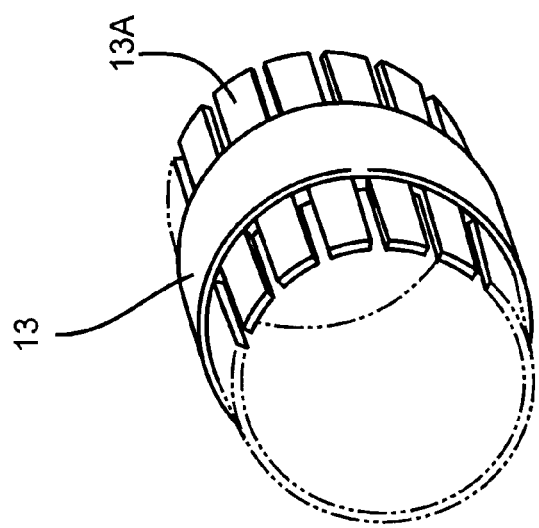
FIG. 13

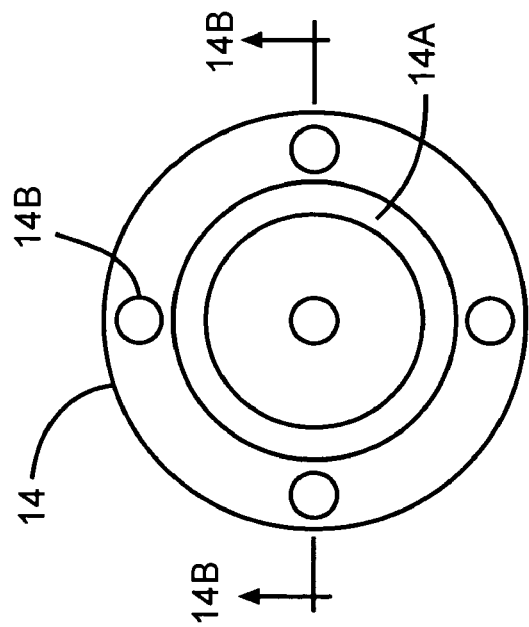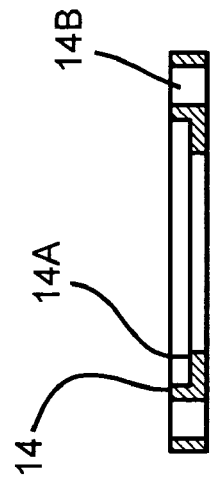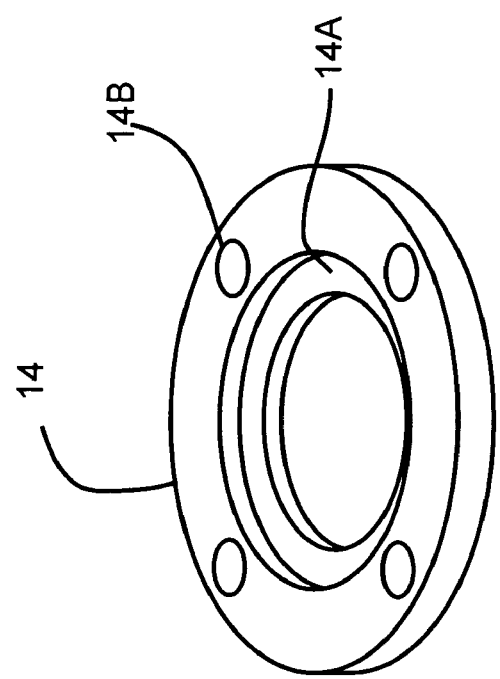

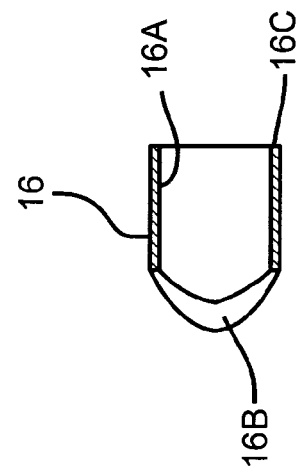
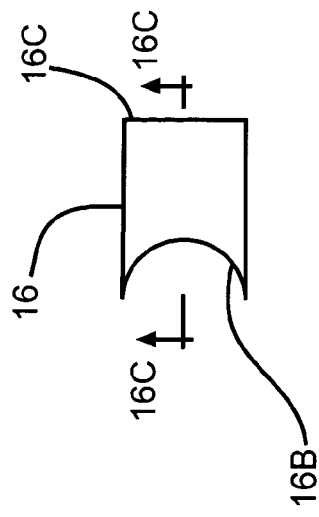
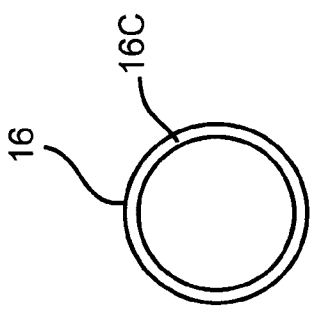
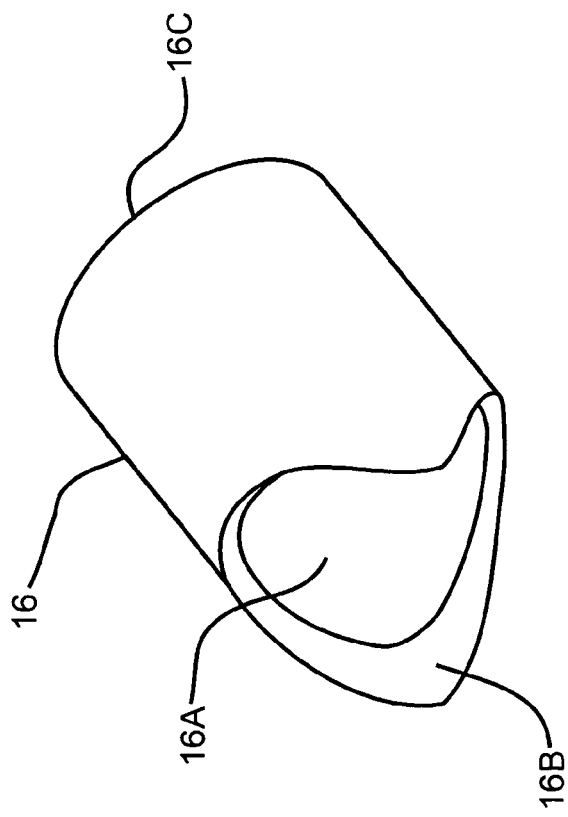

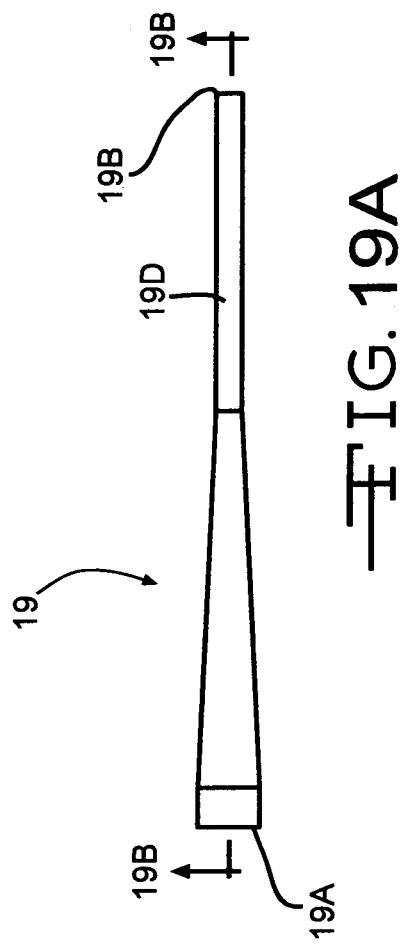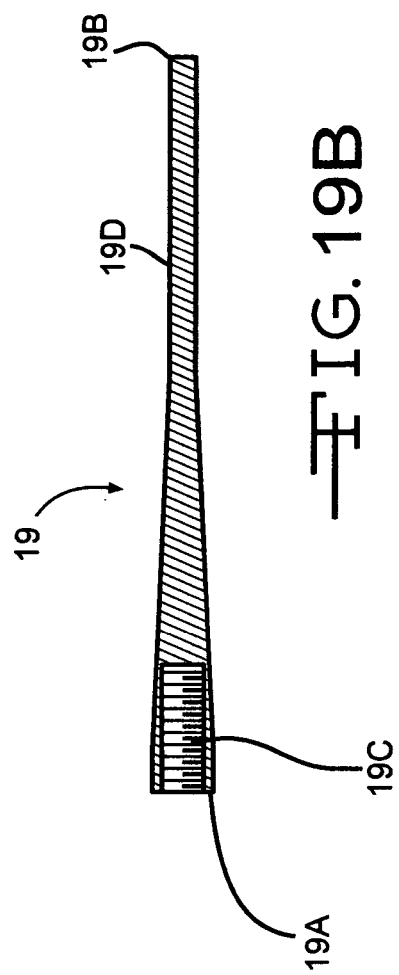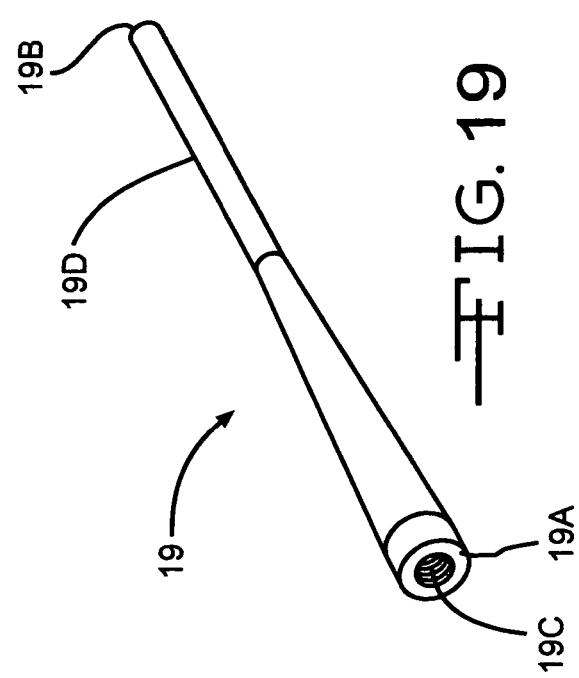

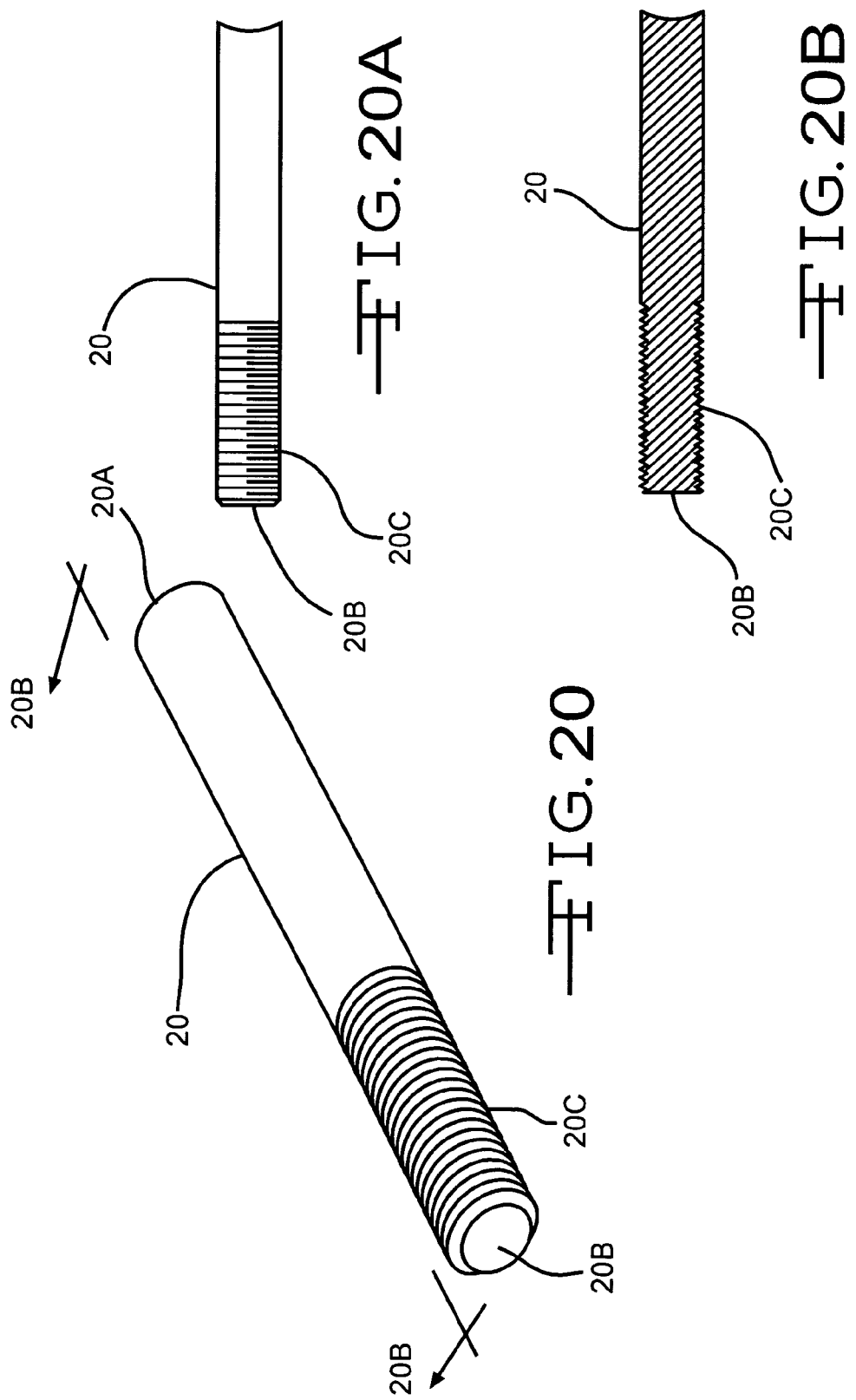

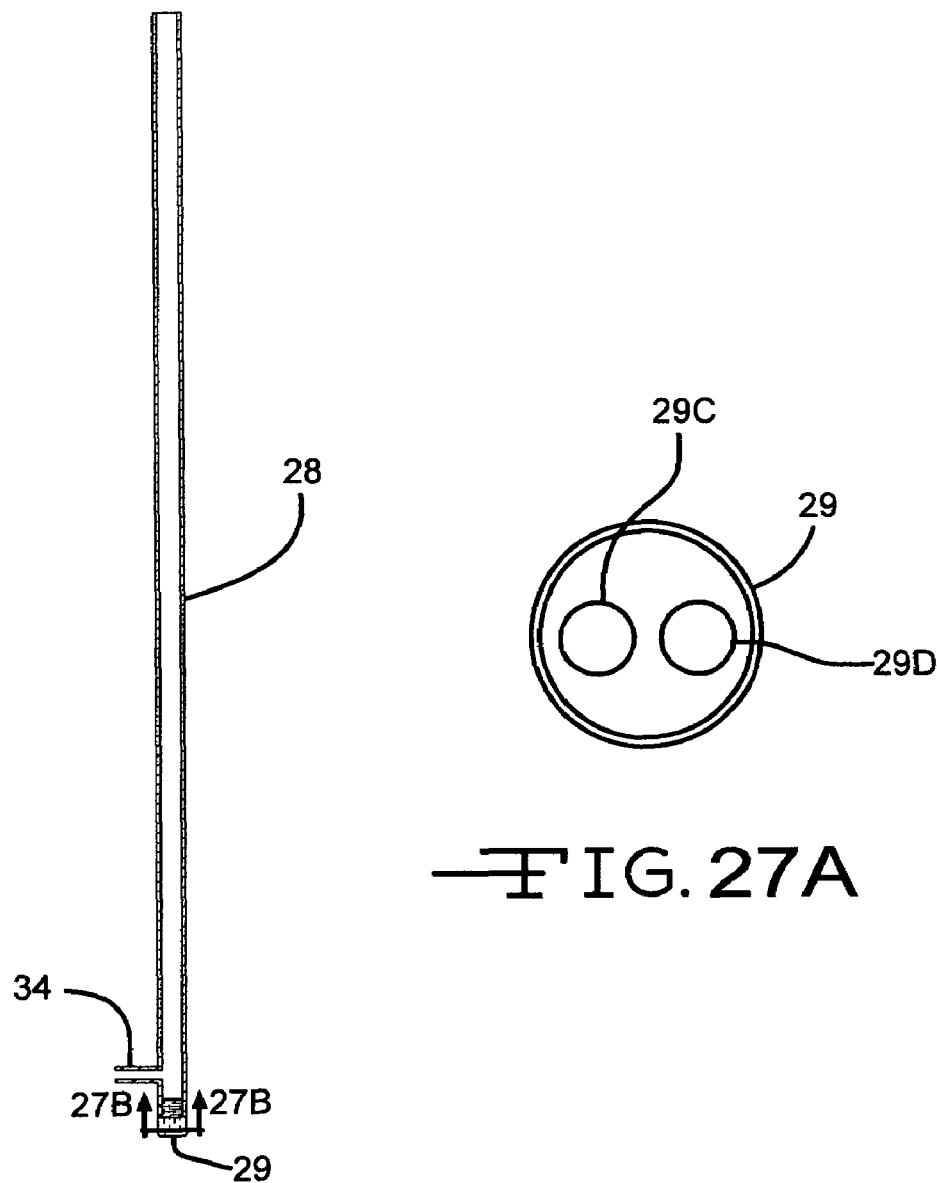

MINIATURE MICROWAVE PLASMA TORCH APPLICATION AND METHOD OF USE THEREOF

CROSS-REFERENCE TO RELATED APPLICATIONS

This application claims priority to provisional Patent Application Ser. No. 60/560,145 filed Apr. 7, 2004.

STATEMENT REGARDING FEDERALLY SPONSORED RESEARCH OR DEVELOPMENT

Not Applicable

REFERENCE TO A "COMPUTER LISTING APPENDIX SUBMITTED ON A COMPACT DISC"

Not Applicable

BACKGROUND OF THE INVENTION (1) Field of the Invention

This invention relates to a microwave plasma torch apparatus which enables the production of a miniature plasma. The present invention also relates to a method for the use of the apparatus.

(2) Description of Related Art

Microwave plasma discharge source design and applications have been well developed over the past three decades. Various microwave plasma sources have been demonstrated with many gases over an operating range of pressures from 0.1 mTorr to several atmospheres, input powers from one watt to six kilowatts, and discharge diameters from 0.2 mm to 25 cm. Many basic microwave coupling and discharge structures have been investigated including quartz dome confined disk shaped plasmas at the end of resonant cavities, atmospheric microwave discharge jets/torch, stripline applicators for miniature microwave discharge generation and tubes through waveguides.

Some related art include: J. Asmussen, "Electron cyclotron resonance microwave discharges for etching and thin-film deposition," *J. Vac. Sci. Technol.* A, vol. 7, pp 883-893 (1989). J. Asmussen, J. Hopwood, and F. C. Sze, "A 915 MHz/2.45 GHz ECR plasma source for large area ion beam and plasma processing," *Rev. Sci. Inst.*, vol. 6 pp 250-252 (1990). J. Asmussen, T. Grotjohn, P. Mak and M. Perrin, "The design and application of electron cyclotron resonance discharges," Invited Paper for the 25th anniversary edition of the IEEE Trans. on Plasma Science, 25, 1196-1221 (1997). T. A. Grotjohn, A. Wijaya and J. Asmussen, Microwave Microstripline Circuits for the Creation and Maintenance of Mini and Micro Microwave Discharges, U.S. Pat. No. 6,759,808 issued Jul. 6, 2004. T. A. Grotjohn, J. Asmussen and J. Narendra, "Microstripline applicator for generating microwave plasma discharges," 2003 NSF Design, Manufacturing and Industrial Innovation Conference Proceedings, Birmingham, Ala. 2003. J. Hopwood, D. K. Reinhard and J. Asmussen, "Experimental conditions for uniform anisotropic etching of silicon with a microwave electron cyclotron resonance plasma system," *J. Vac. Sci. Technol.* B., vol. 6 1896-1899 (1988). J. Hopwood, D. K. Reinhard and J. Asmussen, "Charged particle densities and energy distributions in a multipolar electron cyclotron resonant plasma etching source," *J. Vac. Sci. Technol.* A, vol. 8, pp 3103-3112 (1990). G. King, F. C. Sze, P. Mak, T. A. Grotjohn and J. Asmussen "Ion and neutral energies in a multipolar electron cyclotron resonance plasma source," *J. Vac. Sci. Technol.* A, vol. 10, pp 1265-1269 (1992). P. Mak, G. King, T. A. Grotjohn, and J. Asmussen, "Investigation of the influence of electromagnetic excitation on election cyclotron resonance discharge properties," *J. Vac. Sci. Technol.* A, vol 10, pp 1281-1287 (1992). S. Whitehair, J. Asmussen and S. Nakanishi, "Microwave electrothermal thruster performance in helium gas," *J. of Propulsion and Power*, vol 3, pp. 136-144 (1987).

In a microwave torch, gas flows through a nozzle structure and microwave energy is introduced to create the discharge. Atmospheric pressure or near atmospheric pressure microwave plasma torches have application in the general areas of cutting, welding, toxic materials destruction, plasma-assisted CVD, plasma-assisted etching, surface treatment and materials heating. A variety of materials can be processed including metals, fiberglass, ceramics, and textiles.

In general, plasma torches can produce higher gas temperatures and/or higher reactive species than simple combustion processes. Microwave powered plasma torches have an advantage over transferred arc plasma sources in that the material being cut or processed does not need to be a metal. Hence, they can perform plasma cutting or processing on non-conducting materials such as ceramics and fiberglass, or on multi-layer materials. Also the ability to control the power level and flow rate yields a wide range of processing conditions. Applications range from gentle surface treatment for use in surface sterilization to intense torches for cutting very high temperature materials. Microwave sources/torches also have the advantage compared to DC electrode based systems that they can operate readily with reactive gases, such as oxygen, without rapid electrode erosion problems. The specific related art is cited at the end of the specification.

The ability of microwave sources/torches to process a wide variety of materials is similar to laser based processes such as cutting and welding. The trade-off between plasma torches and lasers is that laser cutting, for example, gives a cut width of 0.01-0.05 mm, and known microwave torches are limited to cut widths of several 100's of microns. However, an important advantage of the microwave plasma torch is that its capital investment can be considerably less than the equivalent laser processing technology. Plasma torches can also be combined with laser technology to produce a hybrid cutting tool. In these hybrid tools the plasma jet has a laser beam propagating down the center of the jet. Because the plasma jet is heating the material, almost all the laser energy can be applied to the energy needed for high-precision deep cuts. This hybrid torch/laser technology thus is able to use a less costly laser system while still achieving the processing rate of a more costly laser system. There is a need for miniature microwave torches.

U.S. Pat. No. 4,611,108 to Leprince et al. discloses a microwave plasma torch excited by means of microwave energy delivered by a rectangular cross-section waveguide which is transversed by a delivery tube extending to the discharge outlet. A rectangular piston in the waveguide is capable of displacement in a sliding motion to form a short-circuit and is one of the factors to permit impedance-matching of the system. The delivery tube is hollow to carry a gas to the end which narrows to a discharge outlet having a 2 mm internal diameter. There is no liquid cooling system.

U.S. Pat. No. 6,184,982 to Karanassios discloses an in-torch vaporization sample introduction system for sample introduction into a spectrometer. The inductively-coupled plasma device (Fassel-type torch) includes a plasma with a central channel and load coil, fed by Argon though outer and intermediate feed channels in an enlarged gas tube.

U.S. Pat. No. 6,213,049 to Yang discloses a nozzle-injector for plasma deposition of thin-film coatings. The nozzle-injector utilizes an arc torch as the plasma generator and releases the plasma into a vacuum chamber reactor towards a substrate to be coated.

U.S. Pat. No. 6,218,640 to Selitser discloses a method of processing a semiconductor device using an inductive plasma torch. An inductive coil is used to apply an oscillating magnetic field to a plasma confinement tube to ignite and sustain a plasma.

U.S. Pat. No. 6,397,776 to Yang et al. discloses an expanding thermal plasma system for large area chemical vapor deposition. Each of a plurality of plasma generating means produce an expanding plume of plasma which impinge on a substrate within a deposition chamber for the purpose of producing a coating on the substrate.

While the related art teach microwave plasma torches, there still exists a need for a miniature microwave torch which provides a small plasma discharge.

OBJECTS

An object of the present invention is to provide a miniature microwave plasma torch apparatus that operates near or at atmospheric pressure for use in materials processing. The miniature plasma torch can also be applied to plasma torch spectroscopy applications. The apparatus provides a wide range of flow rates so that discharge properties vary from diffusional flow of radicals for gentle surface processing to high velocity, approaching supersonic, torch discharges for cutting and welding applications. It is particularly an object of the present invention to provide a miniature microwave plasma torch with a materials processing spot size of about 0.25 mm to a few mm's. Another object is to provide a hybrid microwave plasma torch/laser apparatus for materials processing.

BRIEF DESCRIPTION OF DRAWINGS

FIG. 3 illustrates a cutaway perspective view and FIG. 4 illustrates a cutaway side view the microwave torch apparatus 10 in operation. A plasma discharge 40 is shown at the nozzle 35 of the microwave torch apparatus 10. The flow rate is 200 sccm argon. The microwave power absorbed in the apparatus is 15 to 20 W (Watts). The plasma discharge 40 that extends from the torch apparatus 10 is 400-700 μm (micrometer) in diameter and 3-4 mm (millimeter) long.

FIG. 12 is a perspective view of the cone shaped coaxial taper 12 of the microwave torch apparatus 10. FIG. 12A is a side view of the cone shaped coaxial taper 12. FIG. 12B is a cross-section of the cone shaped coaxial taper 12 taken along line 12B-12B of FIG. 12A.

FIG. 13 is a perspective view of the finger coupling 13 of the microwave torch apparatus 10. FIG. 13A is an end view of the finger coupling 13. FIG. 13B is a side view of the finger coupling 13. FIG. 13C is a cross-section of the finger coupling 13 along line 13C-13C of FIG. 13B. FIG. 13D is a cross-section of the finger coupling 13 along line 13D-13D of FIG. 13B.

FIG. 14 is a perspective view of the adjustable coupling flange 14 of the microwave torch apparatus 10. FIG. 14A is an end view of the adjustable coupling flange 14. FIG. 14B is a cross-section of the adjustable coupling flange 14 taken along line 14B-14B of FIG. 14A.

FIG. 16 is a perspective view of the flange tube 16 of the microwave torch apparatus 10. FIG. 16A is an end view of the flange tube 16. FIG. 16B is a side view of the flange tube 16. FIG. 16C is a cross-section of the flange tube 16 taken along line 16C-16C of FIG. 16B.

FIG. 19 is a perspective view of the core 19 of the microwave torch apparatus 10. FIG. 19A is a side view of the core 19. FIG. 19B is a cross-section of the core 19 taken along line 19B-19B of FIG. 19A.

FIG. 20 is a perspective view of the rod 20 of the microwave torch apparatus 10. FIG. 20A is a side view of the rod 20. FIG. 20B is a cross-section of the rod 20 taken along line 20B-20B of FIG. 20.

FIG. 27 is a cross-sectional view of the inner conductor 28. FIG. 27A is a cross-sectional view of the inner conductor 28 and inner conductor cap 29 taken along line 27B-27B of FIG. 27.

SUMMARY OF THE INVENTION

Figure 1:
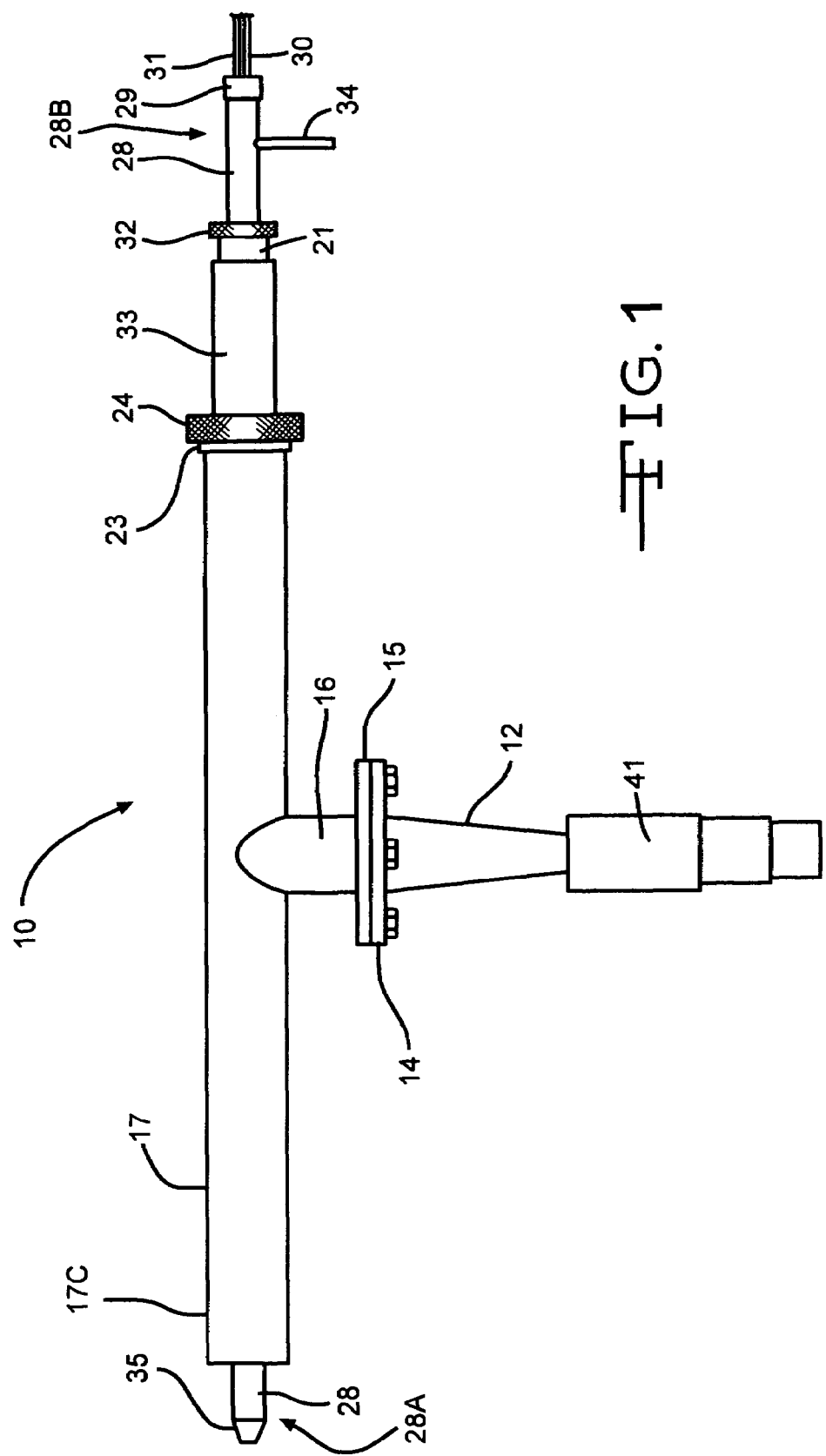
FIG. 1 is a side view of the miniature coaxial microwave torch apparatus 10 of the present invention.

The present invention provides a microwave plasma torch (discharge) apparatus which comprises: an elongate tuneable microwave applicator with opposed ends comprising inner and outer conductive tubular members defining the microwave applicator, the applicator having an inlet port for the microwaves and the inner tubular member defining an inwardly tapering nozzle support having an opening on one of the ends of the applicator; a first conduit member mounted through the applicator secured in the opening in the nozzle support for supplying a gas through an orifice isolated at the end of the first conduit member for generating the plasma torch (discharge) produced by the microwaves in the applicator; a second conduit member mounted adjacent to the first conduit member for supplying a cooling fluid which cools the inner tubular member, the nozzle and the first conduit member while the torch (discharge) is operating.

In further embodiments the orifice in the first conduit member has a diameter of less than about 1 mm. Preferably, the applicator is tuneable by a (tuning stub 21) between the tubular members. In further embodiments the inner tubular member is slidably mounted through a support inside the outer tubular member. In still further embodiments the inner tubular member is supported inside the outer tubular member by non-conductive spacers. In further embodiments the outer tubular member has an inner diameter of about 1.27 cm or less and the inner tubular member has an outside diameter of less than about 0.5 cm and the first and second conduit members are each less than about 0.25 cm in outside diameter. In preferred embodiments the torch (plasma) formed by the plasma at the orifice has a diameter of less than about 1 mm. In further embodiments the microwave energy inlet port is provided intermediate the ends of the applicator. In further embodiments a first conduit member is mounted through the applicator at the end opposite the end of the nozzle support.

The present invention provides a method for treating a substrate which comprises: (a) providing a microwave plasma torch (discharge) apparatus which comprises: an elongate tuneable microwave applicator with opposed ends comprising inner and outer conductive tubular members defining the microwave applicator, the applicator having an inlet port for the microwaves and the inner tubular member defining an inwardly tapering nozzle support having an opening on one of the ends of the applicator; a first conduit member mounted through the applicator secured in the opening in the nozzle support for supplying a gas through an orifice in the first conduit member for generating the plasma torch (discharge) produced by the microwaves in the applicator; a second conduit member mounted adjacent to the first conduit member for supplying a cooling fluid which cools the inner tubular member, the nozzle, and the first conduit member, while the torch is operating, adjacent to the substrate and generating the plasma so that the substrate can be acted upon by the plasma; and (b) generating the plasma to produce the plasma torch (discharge) at the orifice to treat the substrate while providing the cooling fluid in the second conduit.

In further embodiments the inlet port is provided intermediate the ends of the applicator. In further embodiments the first conduit member is mounted through the applicator from an opposite of the ends of the applicator from the nozzle support. In preferred embodiments, the applicator is tunable by varying the position of the inner tubular member

DESCRIPTION OF PREFERRED EMBODIMENTS

The present invention relates to a microwave plasma torch apparatus which comprises: (a) an elongate tuneable microwave applicator with opposed ends comprising inner and outer conductive tubular members defining the microwave applicator, the applicator having an inlet port for the microwaves and the inner tubular member defining an inwardly tapering nozzle support having an opening on one of the ends of the applicator; (b) a first conduit member mounted through the applicator secured in the opening in the nozzle support for supplying a gas through an orifice in the first conduit member for generating the plasma torch (flame discharge) produced by the microwaves in the applicator; (c) a second conduit member mounted adjacent to the first conduit member for supplying a cooling fluid which cools the inner tubular member, the nozzle and the first conduit member while the torch is operating.

The present invention also relates to a method for treating a substrate which comprises: (a) providing a microwave plasma torch apparatus which comprises: an elongate tuneable microwave applicator with opposed ends comprising inner and outer conductive tubular members defining the microwave applicator, the applicator having an inlet port for the microwaves and the inner tubular member defining an inwardly tapering nozzle support having an opening on one of the ends of the applicator; a first conduit member mounted through the applicator secured in the opening in the nozzle support for supplying a gas through an orifice in the first conduit member for generating the plasma torch (discharge) produced by the microwaves in the applicator; a second conduit member mounted adjacent to the first conduit member for supplying a cooling fluid which cools the inner tubular member, the nozzle and the first conduit member, while the torch is operating, adjacent to the substrate and generating the plasma so that the substrate can be acted upon by the plasma;

and (b) generating the plasma to produce the torch (discharge) at the orifice to treat the substrate while providing the cooling fluid in the second conduit.

The present invention provides a compact, atmospheric pressure, miniature microwave plasma torch apparatus. The torch has a minimal size, an efficient microwave power utilization and a versatility that allows easy adaptation to various applications. One specific application is a hybrid microwave plasma torch/laser system for materials processing. Markets for the miniature torch include the cutting of non-metallic materials. Metal can be readily cut using transfer arc plasma sources. The non-metallic materials here include ceramics, fiberglass, textiles, and multi-layer materials that could contain metals, ceramics and fiberglass. A second market for the microwave torch is the processing of materials, which in addition to cutting, includes welding and cleaning with reactive gases. This includes the use of oxygen torches, fluorine containing torches, nitrogen containing torches. Another is the destruction of various volatile organic compounds using the high processing temperature of microwave torches. Other possible markets related to the cleaning, decontamination, surface processing of materials using a low gas temperature, atmospheric pressure plasma source of reactive radicals. Additionally, the microwave plasma torch technology developed can be applied to a wider variety of applications beyond materials processing including (1) destruction of volatile organics (VOC's), freon compounds, and other toxic gases, (2) sterilization of surfaces, and (3) pretreatment of fuels for improving burning efficiency and cleanliness. A compact microwave torch can be used to cut multi-layer materials rapidly.

The second aspect of this invention is to use the microwave plasma torch apparatus to assist with laser processing. This is a hybrid materials processing technology that combines laser cutting/welding with microwave torch technology. The basic idea of using a hybrid technology is that in some applications the microwave torch technology can be used to heat the material being cut/processed so that the laser can be used more efficiently to perform the cutting without most of the energy going to just heat up the material. Microwave torches are used in emission spectroscopy systems for the plasma excitation source.

Figure 2:
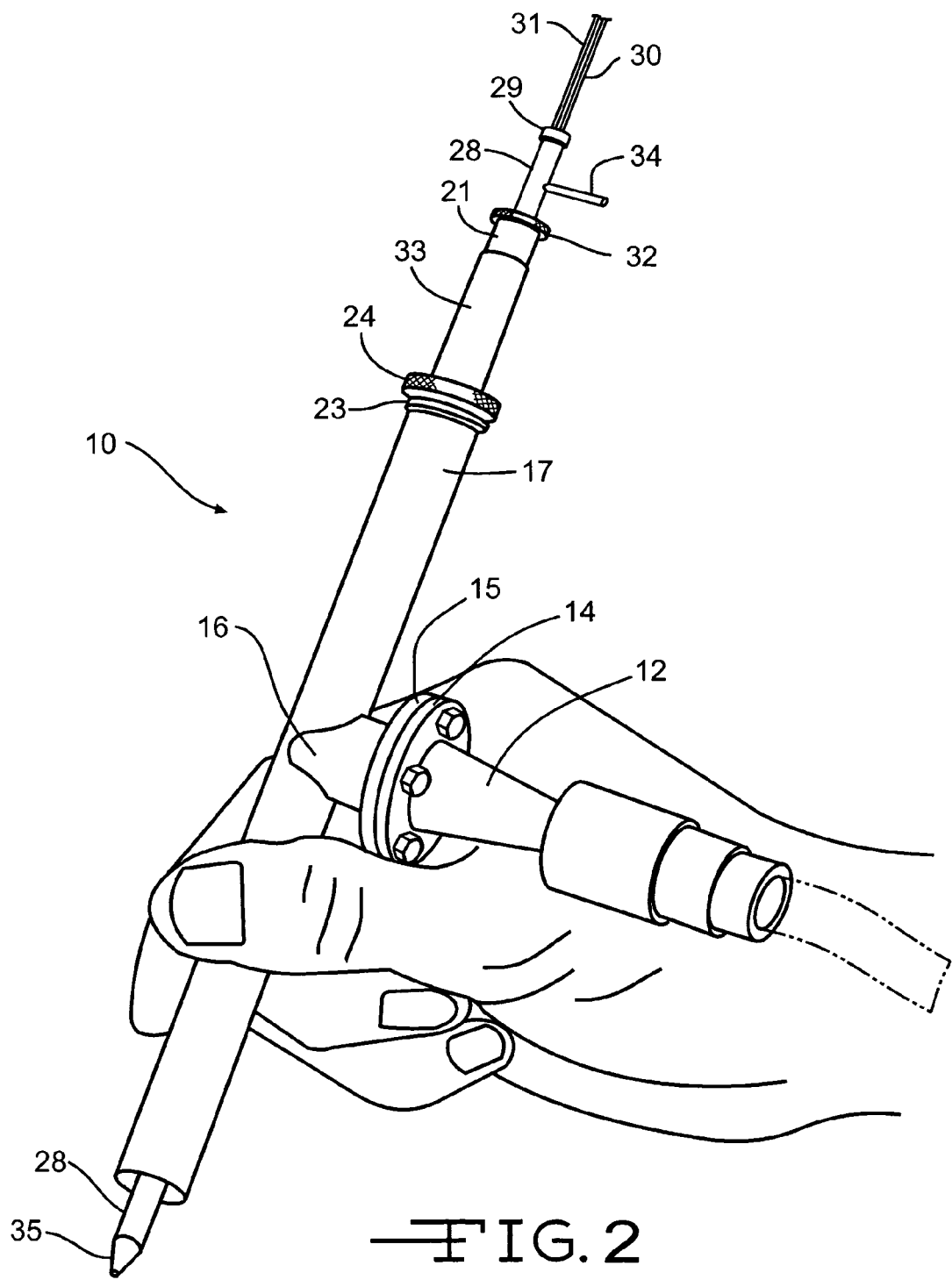
FIG. 2 is a side view of the microwave torch apparatus 10 held by an operator.
Figure 3:
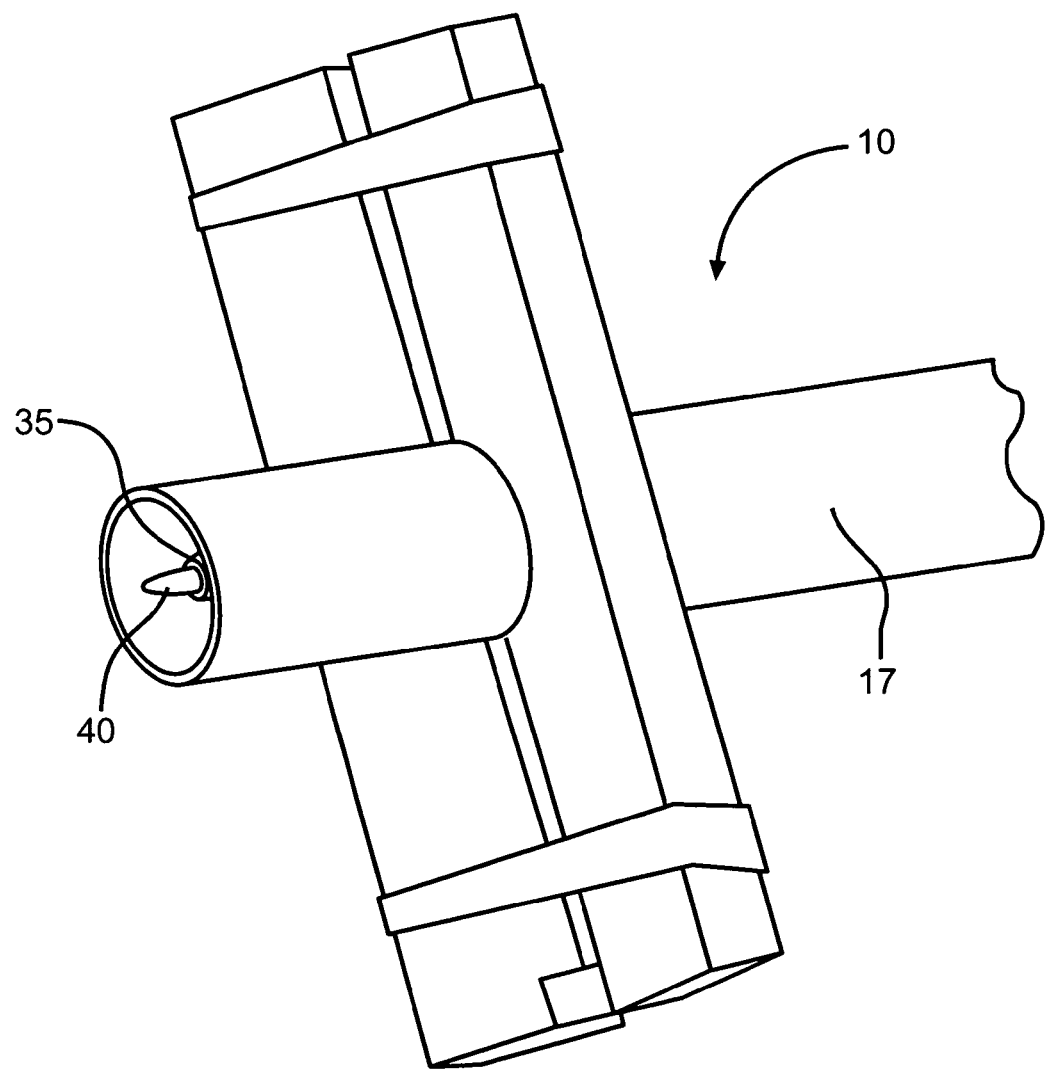

One embodiment of the present invention is illustrated in detail in the Figures. FIG. 1 illustrates the miniature coaxial microwave torch apparatus 10 and FIG. 2 illustrates how the microwave torch apparatus 10 is typically manipulated by an operator. The microwave torch apparatus 10 is comprised of an inner conductor 28 as the inner conductive tubular member coaxially mounted through an outer conductor 17 as the outer conductive tubular member. At a first end 28A of the inner conductor 28 a gas feed tube 30 provides a gas to a nozzle 35, as an inwardly tapering portion of the inner tubular member, coaxially mounted on a second end 28B of the inner conductor 28 where a plasma discharge is formed. A cooling fluid is provided to cool the apparatus 10 in a cooling fluid tube 31 which circulates in the inner conductor 28 before exiting at a cooling fluid output port 34. Microwave energy is provided into a cone shaped coaxial taper 12 which channels the microwave energy into the outer conductor 17 through a flange tube 16, which is affixed to the cone shaped coaxial taper 12 by means of adjustable coupling flange 14 and fixed coupling flange 15, and finally to the nozzle 35 adjacent to a first end 17C of the outer conductor 17. In use, FIGS. 3 and 4 illustrate a plasma discharge 40 formed at the nozzle of the microwave torch apparatus 10. The plasma discharge 40 shown in FIGS. 3 and 4 is formed when argon is provided at a flow rate of 200 sccm. The microwave power absorbed in the apparatus 10 when operated in this manner is 15 to 20 W. The resulting plasma discharge size is 400-700 μm (micrometer) in diameter and 3-4 mm (millimeter) long.

Figure 8:
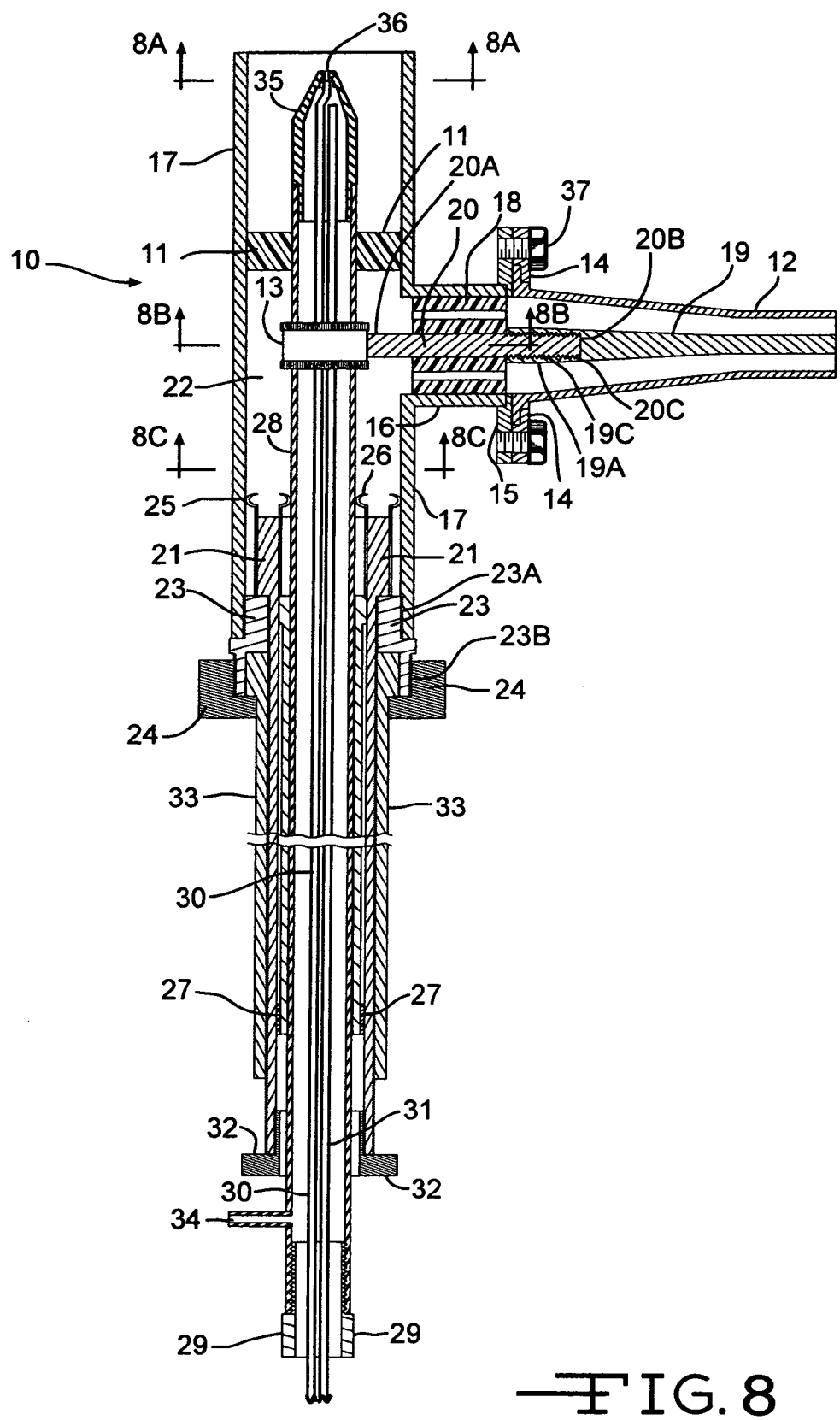
FIG. 8 is a cross-section of one embodiment of the microwave torch apparatus 10 illustrated in FIGS. 1 to 4.
Figure 15A:
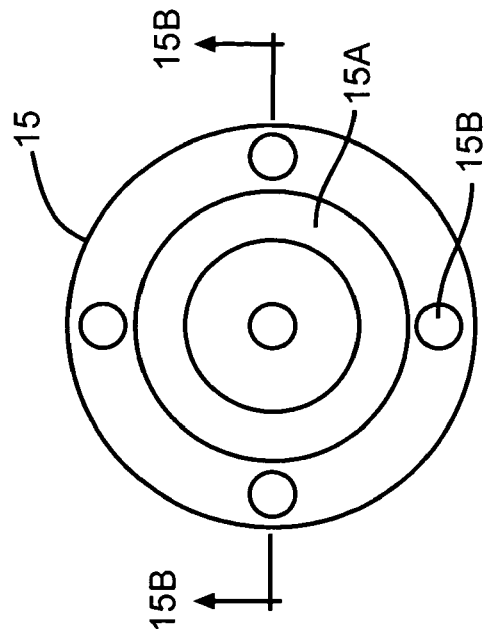
FIG. 15A is an end view of the fixed coupling flange 15.
Figure 15B:
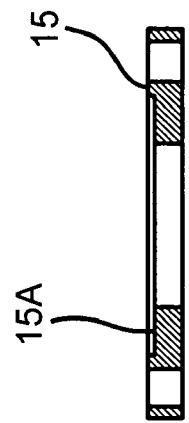
FIG. 15B is a cross-section of the fixed coupling flange 15 taken along line 15B-15B of FIG. 15A.
Figure 15:
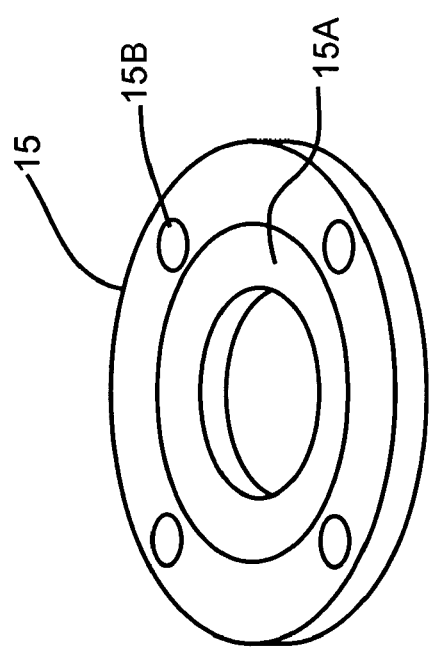
FIG. 15 is a perspective view of the fixed coupling flange 15 of the microwave torch apparatus 10.
Figure 17:
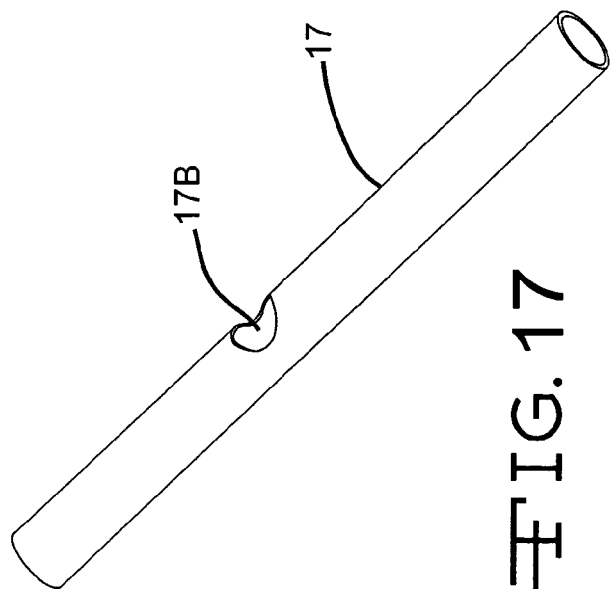
FIG. 17 is a perspective view of the outer conductor 17 of the microwave torch apparatus 10.
Figure 18B:
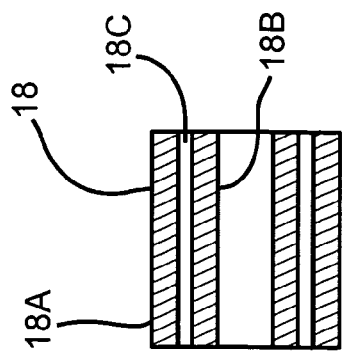
FIG. 18B is a cross-section of the second spacer 18 taken along line 18B-18B of FIG. 18A.
Figure 18A:
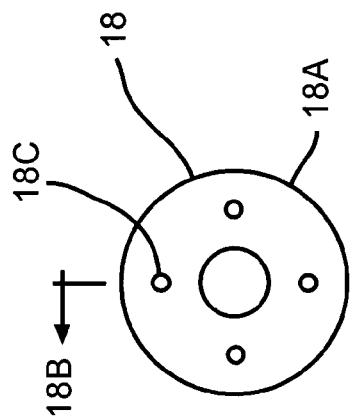
FIG. 18A is an end view of the second spacer 18.
Figure 18:
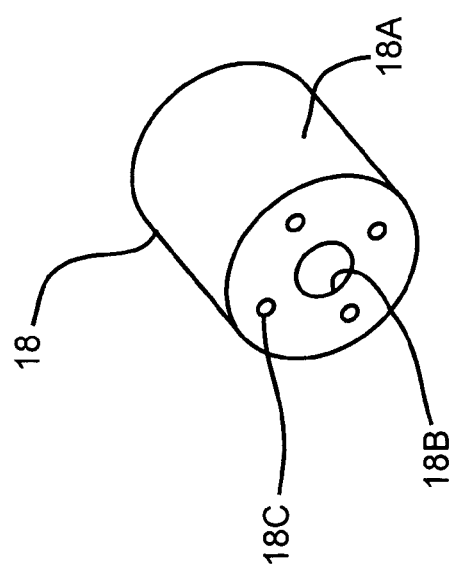
FIG. 18 is a perspective view of the second spacer 18 of the microwave torch apparatus 10.

An assembly of the parts is illustrated in FIG. 8. The cross-section of FIG. 8 shows the nozzle 35 from which the plasma is generated mounted on inner conductor 28 with a first spacer 11 supporting an inner conductor 28 inside the outer conductor 17. The first spacer 11 can be constructed of any suitable non-conductive material, preferably fluoropolymer resin such as TEFLON® brand fluoropolymer resin (Dupont, Wilmington, Del.). Input power is fed into an opening 17B (See FIG. 17) in the side of the outer conductor 17 by means of outer conductor flange tube 16 (See FIG. 11, FIG. 16). An adjustable coupling flange 14 and fixed coupling flange 15 (See FIG. 14. FIG. 15. respectively) are utilized to attach a cone shaped taper 12 (See FIG. 12) to the flange tube 16. A core 19 (See FIG. 19), preferably constructed of brass, is mounted inside taper 12 and passes through the centers of adjustable coupling flange 14 and fixed coupling flange 15. The brass core 19 connects to rod 20 (See FIG. 20) which is mounted inside flange tube 16. The other end of the rod 20 is attached to finger coupling 13. Rod 20 is centered inside flange tube 16 by means of a second spacer 18 (See FIG. 18). Second spacer 18 can also be constructed of any suitable material, preferably fluoropolymer resin such as TEFLON® brand fluoropolymer resin (Dupont, Wilmington, Del.). The brass core 19 inside of taper 12 which connects to rod 20 and is located inside of the flange tube 16, couples microwave energy to the inner conductor flange tube 16.

Figure 8A:
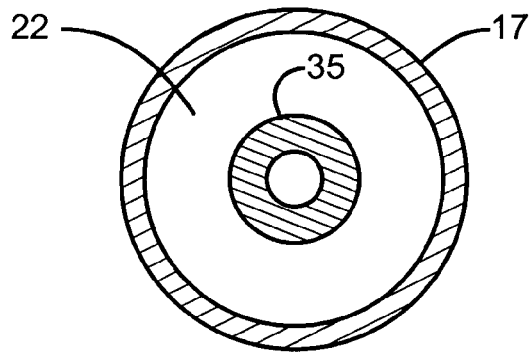
FIG. 8A is a cross-section taken along line 8A-8A.
Figure 9:
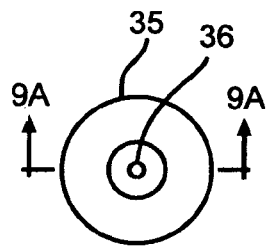
FIG. 9 is an end view of the nozzle 35 of the microwave torch apparatus 10 showing orifice 36.
Figure 9A:
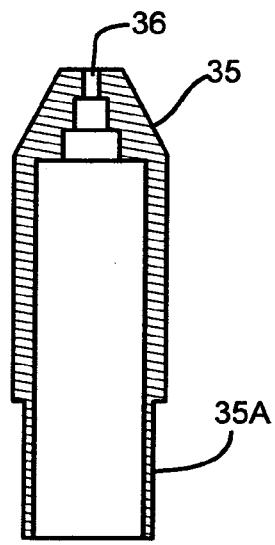
FIG. 9A is a cross-section of the nozzle 35 along line 9A-9A of FIG. 9.
Figure 10:
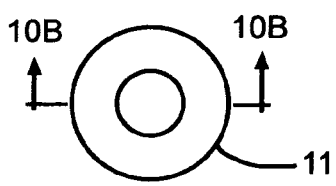
FIG. 10 is an end view of the first spacer 11 of the microwave torch apparatus 10.
Figure 10A:
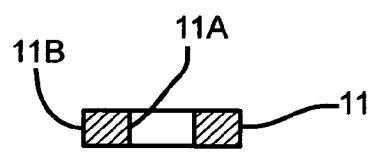
FIG. 10A is a cross-section of the first spacer 11 along line 10A-10A of FIG. 10.
Figure 17C:
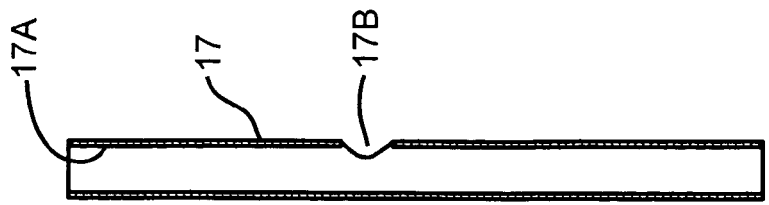
FIG. 17C is a cross-section of the outer conductor 17 taken along line 17C-17C of FIG. 17A.
Figure 17B:
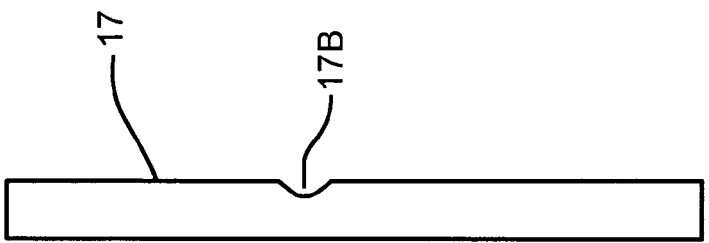
FIG. 17B is a side view of the outer conductor 17.
Figure 17A:
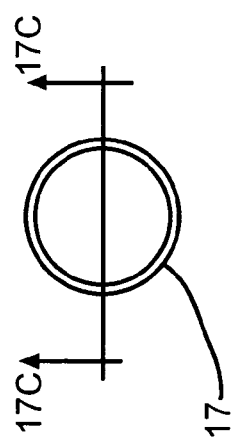
FIG. 17A is an end view of the outer conductor 17.
Figure 28:
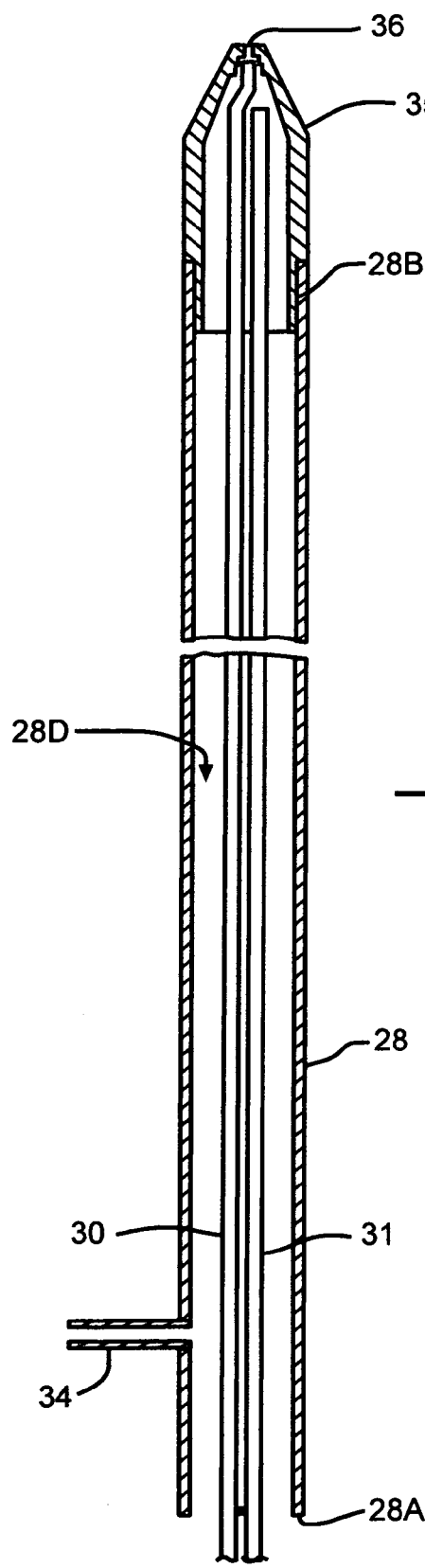
FIG. 28 is a cross-sectional view showing the assembled inner conductor 28 and nozzle 35.

FIG. 8A to FIG. 31 show assembly and detailed drawings of various portions of the preferred apparatus 10 of the present invention. FIG. 8A illustrates a cross-section taken along line 8A-8A (FIG. 8) near the nozzle 35 end of the apparatus 10. The relation of nozzle 35 and the outer conductor 17 can be seen and is spaced by cavity 22. It can be seen in FIG. 9 and FIG. 9A that the nozzle 35 narrows to an orifice 36 as an opening from which gas can emerge to ignite the plasma discharge 40 (FIGS. 3 and 4). The cross-section of the nozzle 35 in FIG. 9A illustrates the orifice 36 from which the gas escapes at a first end and at an opposed end of the nozzle 35 is a narrow portion 35A which fits snugly in the second end 28B (See FIG. 1) of the inner conductor 28 as seen in FIG. 28. FIG. 10 is an end view and FIG. 10A is a cross-section of the first spacer 11 showing an inner surface 11A which fits around the inner conductor 28 and thereby holds both the inner conductor 28 and nozzle 35 in the proper position relative to outer conductor 17. FIG. 17C shows the cross-section of the outer conductor 17 showing an inner surface 17A, which is snugly fit with respect to the outer surface 11B (FIG. 10A) of the first spacer 11.

Figure 8B:
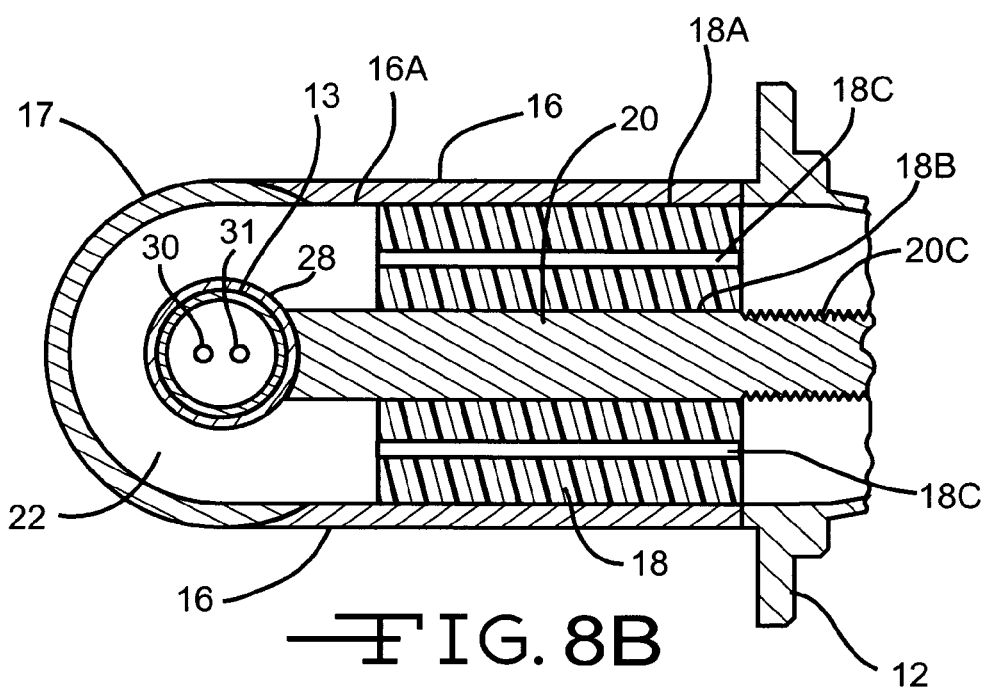
FIG. 8B is a cross-section taken along line 8B-8B.
Figure 11:
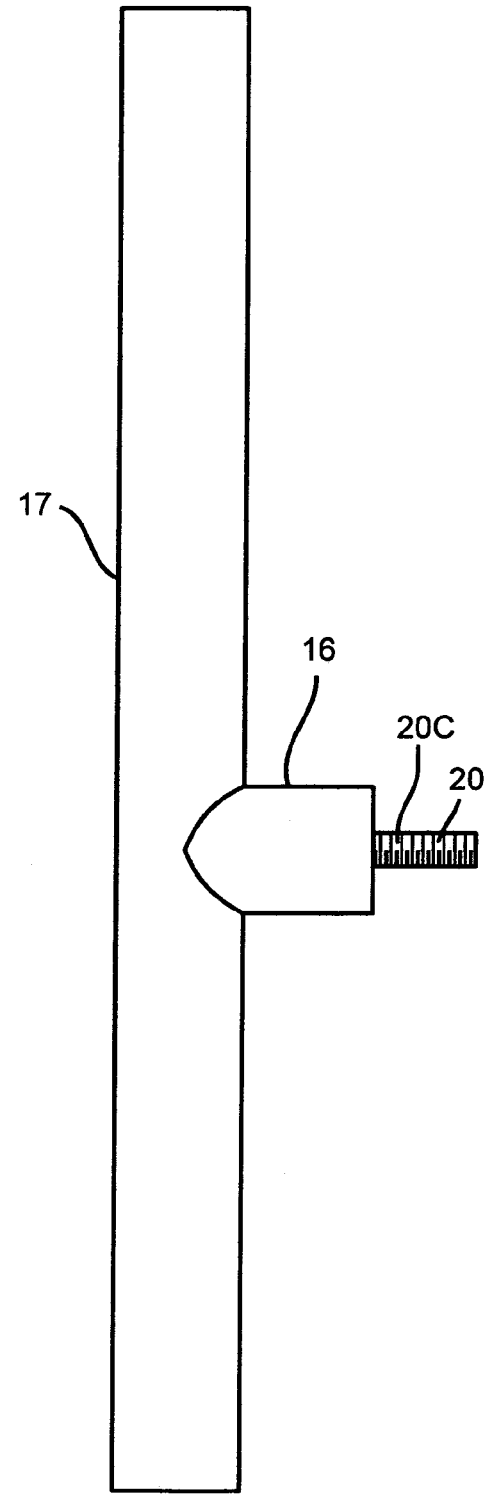
FIG. 11 is a side view of the flange tube 16 and the outer conductor 17 of the microwave torch apparatus 10.

As described previously, the opening 17B in the side of the outer conductor 17 is covered with the flange tube 16, illustrated in FIGS. 16 through 16C, which is affixed to the outer conductor 17 at the curved end 16B of the flange and projects from a side of the outer conductor 17. FIG. 11 is a side view of the assembled flange tube 16 and outer conductor 17 of the microwave torch apparatus 10. Fitting snugly within the flange 16, as best seen in FIG. 8B, is the second spacer 18. The second spacer 18 is shown in detail in FIGS. 18, 18A and 18B, and has four holes 18C running a length of the second spacer 18 opening between the cavity 22 in the outer conductor 17 and a cavity 12D in the cone shaped coaxial taper 12, when the cone shaped coaxial taper 12 is secured against the flat end 16C of the flange 16. The outer surface 18A of the second spacer 18 fits against inner surface 16A of the flange 16, while the inner surface 18B of second spacer 18 fits over the rod 20 to hold it in place. The rod 20 (FIGS. 20, 20A, 20B) runs from a first end 20A, where it is attached to the finger coupling 13 (FIG. 13) having laterally projecting fingers 13A which encircle and grip the inner conductor 28, to a second end 20B having external threads 20C. External threads 20C secure rod 20 to an internal thread 19C in a first end 19A of core 19, seen in FIGS. 19, 19A and 19B. The core 19 narrows down from a first end 19A to a narrow portion 19D at a second end 19B.

Figure 8C:
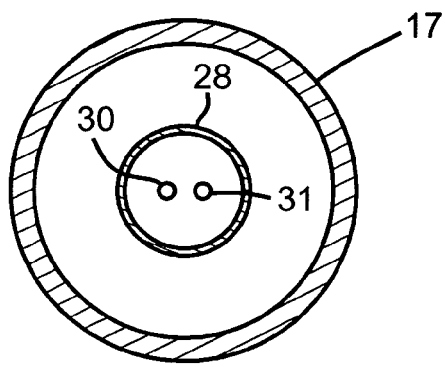
FIG. 8C is a cross-section taken along line 8C-8C of the microwave torch apparatus 10 of FIG. 8.

The core 19 (FIGS. 19, 19A, 19B) is thereby attached and extends longitudinally along a central axis of the cone shaped coaxial taper 12 which is affixed at a first end 12A of the cone shaped coaxial taper 12 (FIGS. 12, 12A, 12B) to the flat end 16C of the flange 16. A depression 14A of the adjustable coupling flange 14 fits over a rim 12B of the taper 12 and the adjustable coupling flange 14 (FIGS. 14, 14A, 14B) is secured to the fixed coupling flange 15 so as to hold the rim 12B in a depression 15A in fixed coupling flange 15 (FIGS. 15, 15A, 15B). Adjustable coupling flange 14 is secured to the flat end 16C of the flange 16 by means of four bolts 37 passing through four holes 14B in the adjustable coupling flange 14 and four holes 15B in fixed coupling flange 15. The fixed coupling flange 15 is affixed to the flat end 16C of the flange 16 by a weld or other means known in the art. The assembled parts of the microwave input portion are best seen in cross-section in FIG. 31. Microwave power is supplied through a coupler (not shown) to an opening at a second end 12C of the cone shaped coaxial taper 12 to supply microwaves into the cavity 12D in the taper and thereby into the cavity 22 in the microwave torch apparatus 10 as illustrated by the arrow labeled "microwave power" in FIG. 30. The microwave power is channeled to the cavity between inner conductor 28 and outer conductor 17 as seen illustrated in FIG. 8C in a cross-section of a central portion of the microwave torch apparatus 10.

Figure 21:
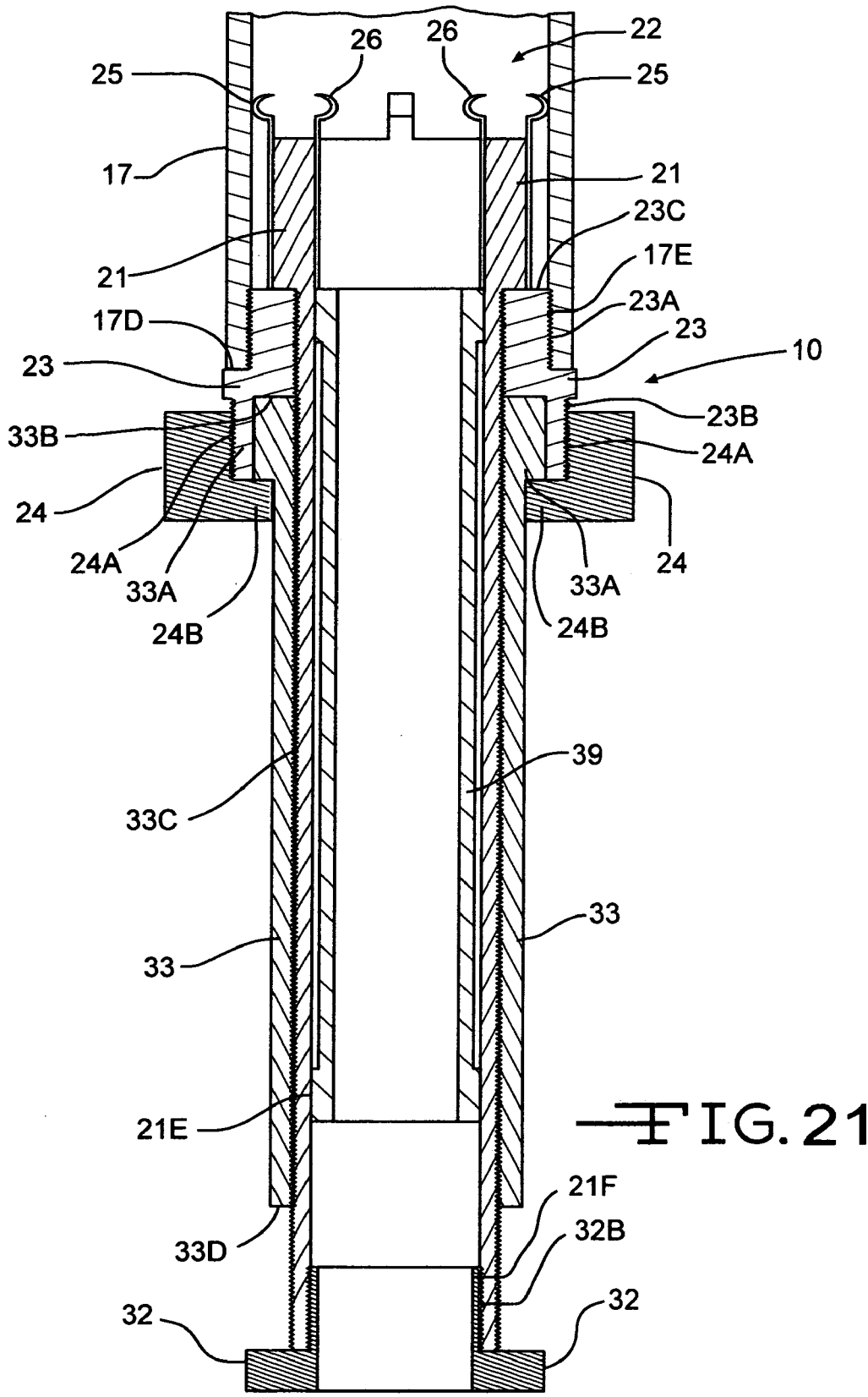
FIG. 21 is a cross-sectional view of a tuning portion of the microwave torch apparatus 10.

FIG. 21 illustrates a cross-sectional view of an assembled tuning portion of the microwave torch apparatus 10 which allows a user to tune the microwaves in the cavity 22. A tuning stub 21 (FIGS. 8, 21 and 22) is mounted between the inner conductor 28 and outer conductor 17 for adjusting the microwave standing wave between the outer conductor 17 and inner conductor 28 to couple microwave energy to the plasma discharge 40. A stub cap 32 is used to adjust the tuning stub 21. The tuning stub 21 is mounted by means of adapter 23, which is secured within outer conductor 17. The adapter 23 has a first thread 23A on an outer surface of a first end 23C of the adapter 23 which is interlocked in a thread 17E in the inner surface 17A at a second end 17D of the outer conductor 17. The adapter 23 supports a nut 24 (FIG. 23B) by means of a second thread 23B on an outer surface of a second end of the adapter 23 which interlocks with internal thread 24A within the nut 24. The rim 24B of the nut 24 grips a rim 33A on a first end 33B of the holder 33 to lock holder 33 in place, while allowing rotational freedom.

Figure 22:
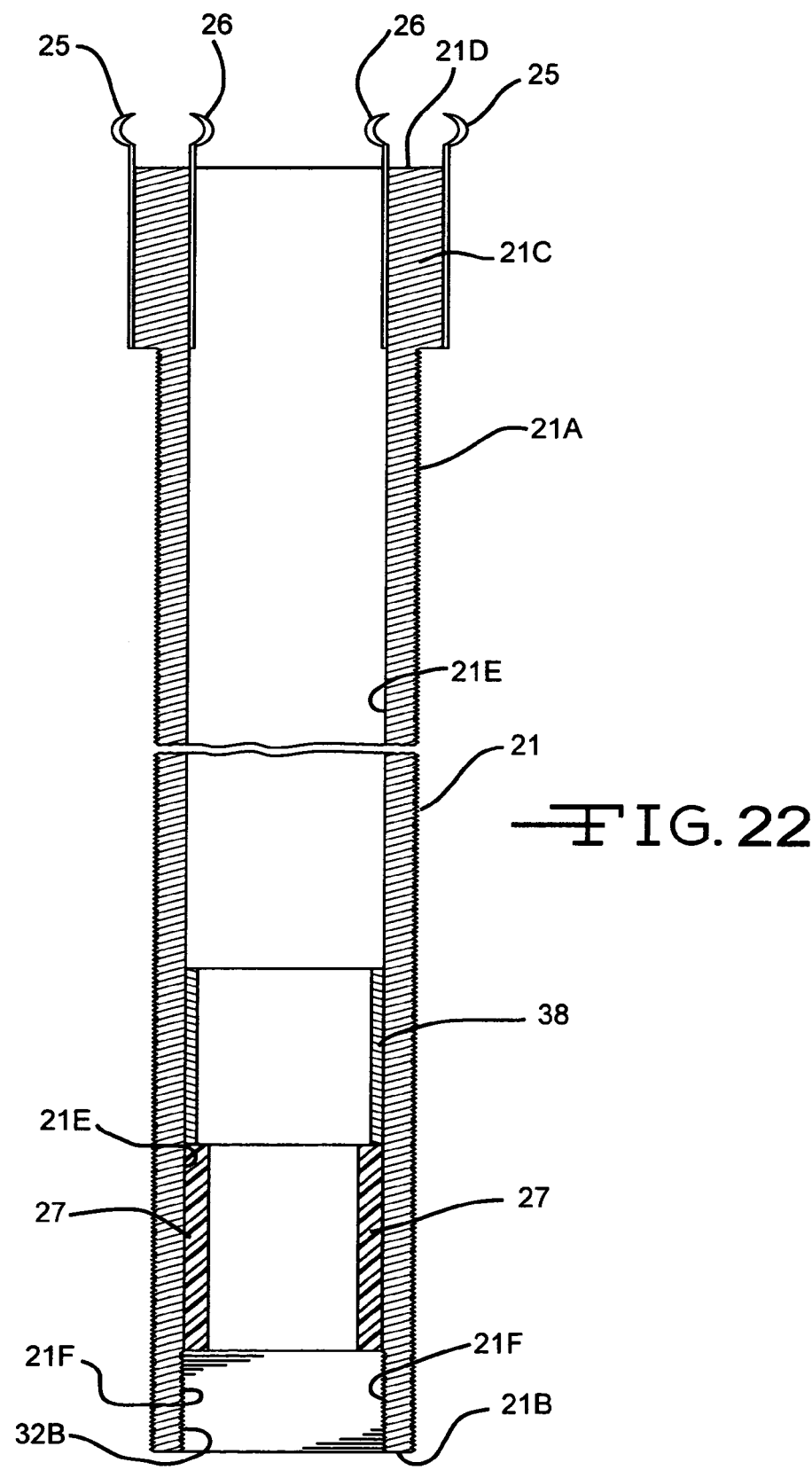
FIG. 22 is a cross-sectional view of the tuning stub 21 of the microwave torch apparatus 10.
Figure 24:
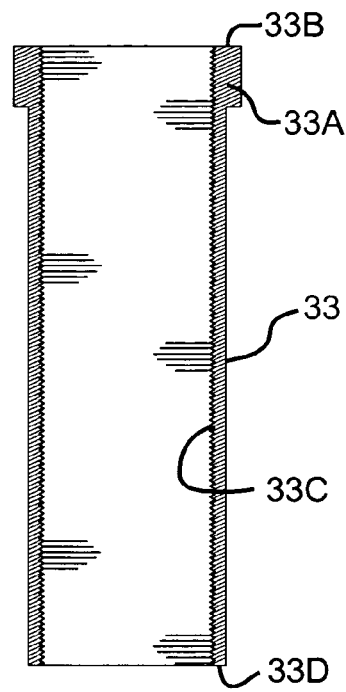
FIG. 24 is a cross-sectional view of the holder 33 of the microwave torch apparatus 10.
Figure 23:
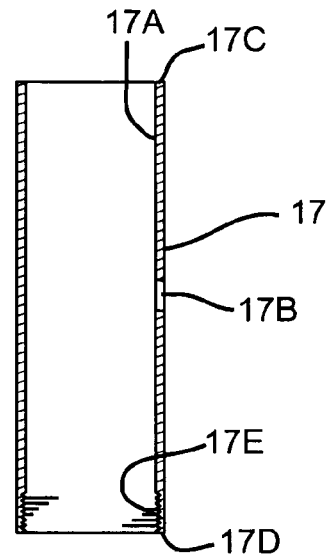
FIG. 23 is a cross-sectional view of the outer conductor 17 of the microwave torch apparatus 10.
Figure 23A:
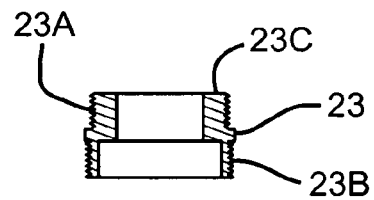
FIG. 23A is a cross-sectional view of the adapter 23 showing first thread 23A and second thread 23B.
Figure 24A:
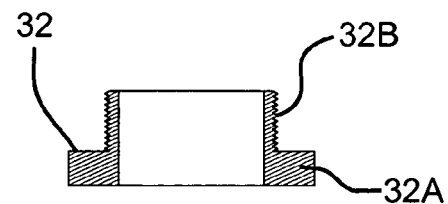
FIG. 24A is a cross-sectional view of the stub cap 32.
Figure 23B:
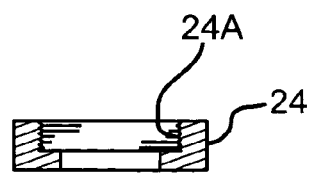
FIG. 23B is a cross-sectional view of the nut 24.
Figure 25:
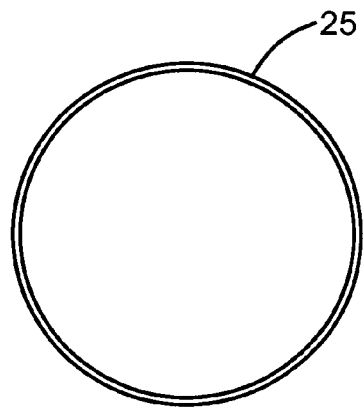
FIG. 25 is an end view of the first finger stock snap ring 25 of the microwave torch apparatus 10.
Figure 25A:
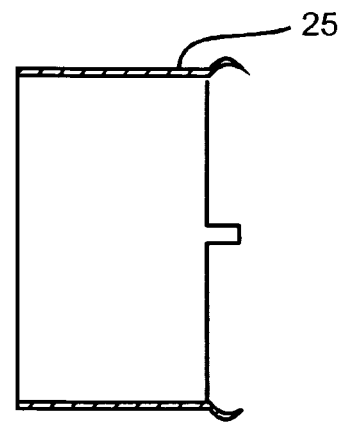
FIG. 25A is a cross-sectional view of the first finger stock snap ring 25 of the microwave torch apparatus 10.
Figure 25B:
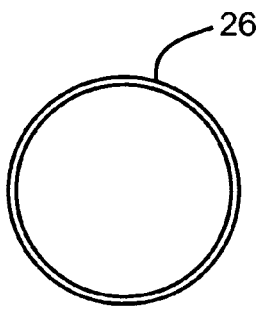
FIG. 25B is an end view of the second finger stock snap ring 26.
Figure 25C:
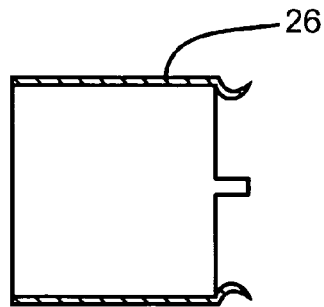
FIG. 25C is a cross-sectional view of the second finger stock snap ring 26.

FIG. 24 illustrates the holder 33 in detail. The external surface of the holder 33 can be knurled to assist gripping when tuning the apparatus 10. An internal thread 33C runs on an internal surface of the holder 33 from first end 33B to second end 33D. The internal thread 33C interlocks with an external thread 21A, as can be seen in FIG. 22, of the tuning stub 21. The external thread 21A extends from a first end 21B of the tuning stub 21 towards a rim 21C disposed at a second end 21D of the tuning stub 21, which allows a user to advance the rim 21C from a position resting against the first end 23C of the adapter 23 inwardly into the cavity 22 between outer conductor 17 and inner conductor 28 so as to tune the microwave torch apparatus 10. Disposed around the rim 21C is a first finger stock snap ring 25 (FIG. 25, 25A) and disposed within the second end 21D beneath the rim 21C is a second finger stock snap ring 26 (FIG. 25B, 25C) so as to be mounted on the tuning stub 21 in contact with the outer conductor 17 and the inner conductor 28, respectively. Finally, in the inner surface 21E at the first end 21B of the tuning stub 21 is an internal thread 21F. An external thread 32B (FIG. 24A) on a first end of the stub cap 32 is threaded into the internal thread 21F of the tuning stub 21 (FIGS. 21 and 22). On a second end of the stub cap 21 is a rim 32A (FIG. 24A).

Figure 26:
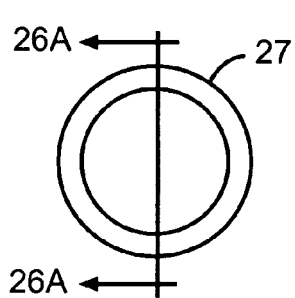
FIG. 26 is an end view of the third spacer 27.
Figure 26A:
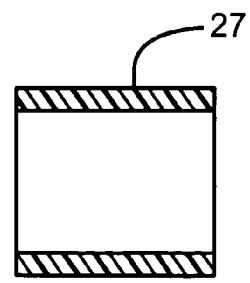
FIG. 26A is a cross-sectional view of the third spacer 27 taken along line 26A-26A of FIG. 26.

As can be seen in FIG. 22, a third spacer 27 (FIG. 26, 26A) is mounted within an inner surface 21E of the tuning stub 21, the third spacer 27 held in place by snap fit ring 38. The third spacer 27 fits over a sleeve (not shown) which surrounds the inner conductor 28. The third spacer 27 can be constructed of any suitable material, preferably fluoropolymer resin such as TEFLON® brand fluoropolymer resin (Dupont, Wilmington, Del.).

This assembly allows for independent adjustment of the tuning stub 21 and the inner conductor 28. In this way the microwaves can be tuned to approximately an impedance matched condition. The gas is fed through gas feed tube 30 into the nozzle 35 to exit the nozzle at orifice 36. Due to the taper on the nozzle 35 between the inner conductor 28 and outer conductor 17 the microwaves are confined to the cavity 22 and a very small plasma discharge 40 is created near the orifice 36 (FIGS. 3 and 4).

Figure 29:
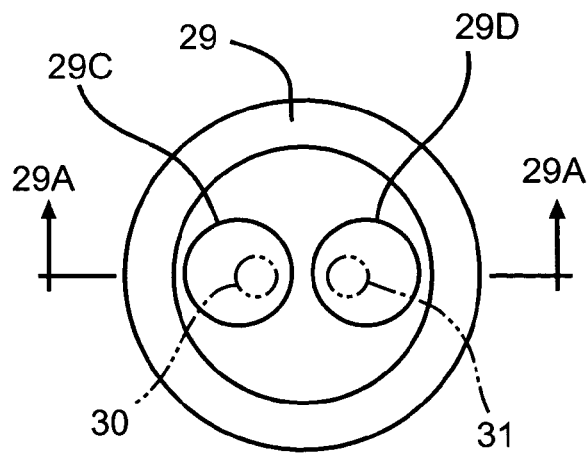
FIG. 29 is an end view of the inner conductor cap 29 of the microwave torch apparatus 10.
Figure 29A:
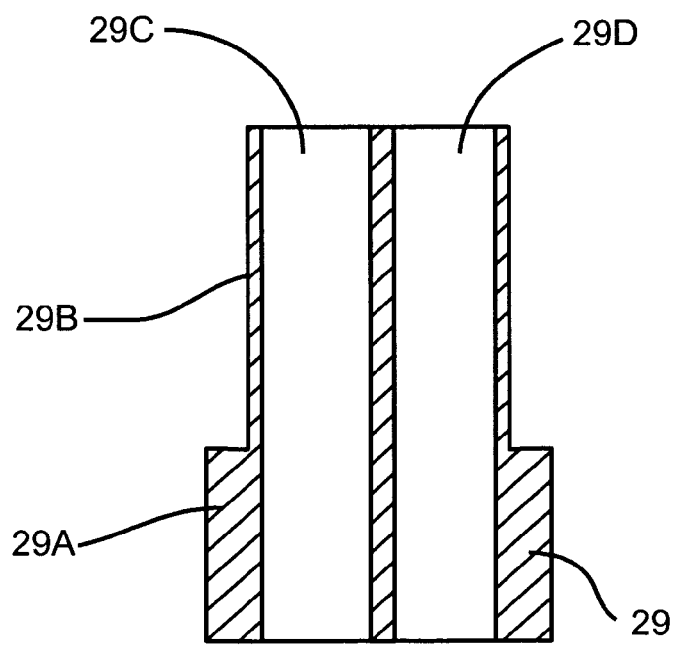
FIG. 29A is a cross-sectional view of the inner conductor cap 29 taken along line 29A-29A of FIG. 29.
Figure 30:
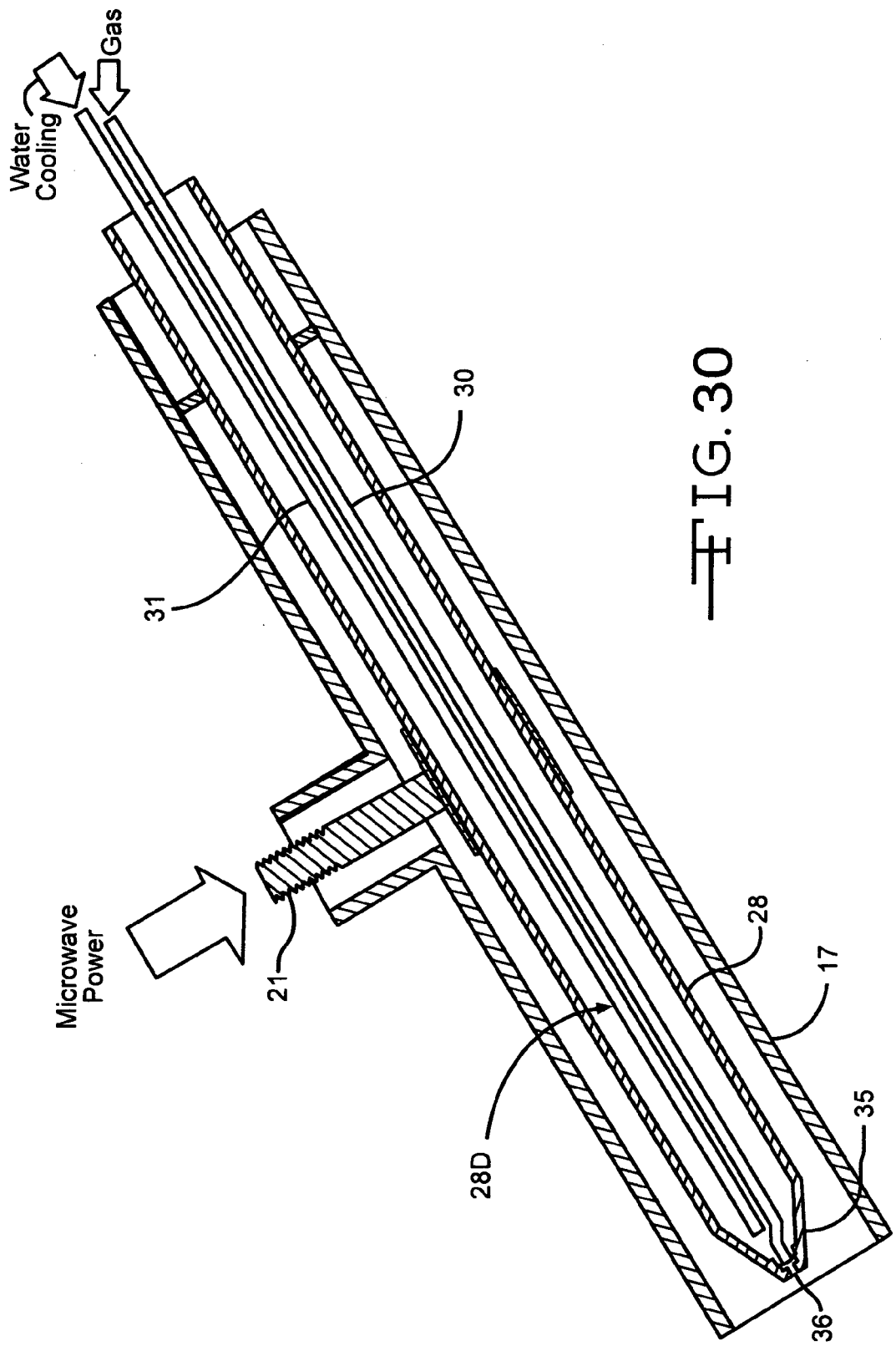
FIG. 30 is a cross-sectional view of the outer conductor 17 and the inner conductor 28 illustrating the microwave power inlet, water cooling inlet and gas inlet of the microwave torch apparatus 10.
Figure 31:
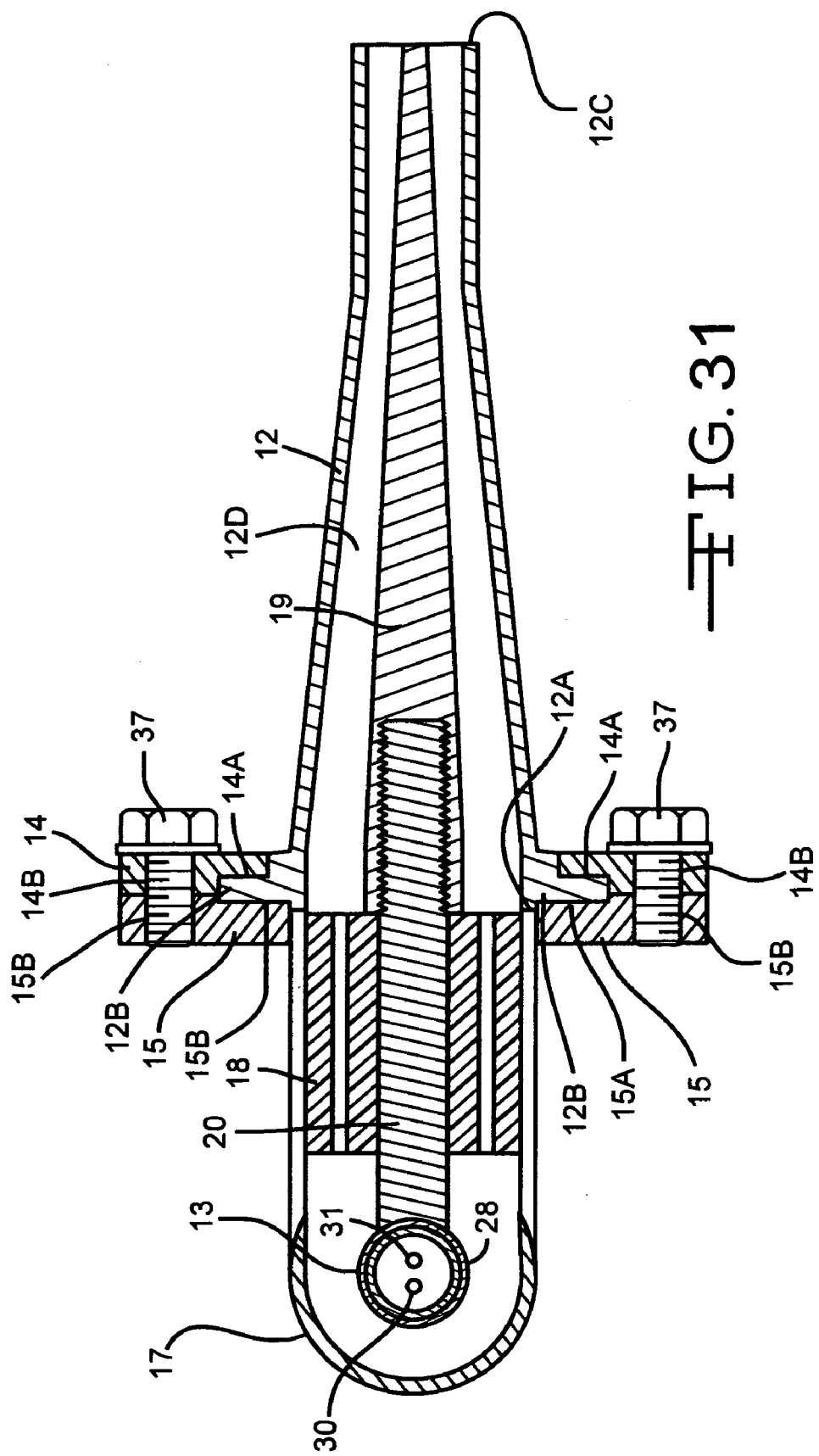
FIG. 31 is a cross-sectional view illustrating the assembled microwave power inlet portion of the microwave torch apparatus 10.

An inner conductor cap 29, illustrated in FIG. 29 and FIG. 29A, supports a first conduit member which is the gas feed tube 30 and a second conduit member which is the cooling fluid tube 31. A narrow portion 29B at a first end of the cap 29 secures into an inner surface at the first end 28A of the inner conductor 28 and is soldered in place. At a second end of the cap 29 a projecting rim 29A rests against the first end 28A of the inner conductor 28. The cooling fluid tube 31 passes through a second hole 29D of the cap 29 to supply a cooling fluid to the inside of the nozzle 35 at the second end 28B of the inner conductor 28 where it then can freely flow back down within a cavity 28D to the first end 28A of the inner conductor 28 to exit out of the cooling fluid output port 34 disposed near the first end 28A of the inner conductor 28. The gas feed tube 30 passes through a first hole 29C in the cap 29 to supply gas to the orifice 36 of the nozzle 35 at the opposing end of the microwave torch apparatus. FIGS. 8, 28 and 30 show the details of the assemblies.

The Figures thus show a miniature coaxial microwave torch apparatus 10 with an inner conductor 28 and outer conductor 17. In a preferred embodiment, the overall apparatus 10 diameter is 12.5 mm (½ inch) and the outer conductor internal diameter is 11.1 mm. The gas is flowed through a 0.4 mm orifice 36 in the nozzle 35 supplied down the center of the apparatus in a gas feed tube 30 passing through an inner conductor 28, the inner conductor 28 having an outer diameter of 4.75 mm. The axial position of the inner conductor 28 is adjustable to change the position of the orifice 36 where the plasma discharge is generated and maintained. The inner conductor 28 is water-cooled, having the cooling fluid flowing through the space in the inner conductor 28 before exiting at the cooling fluid exit port 34. The characteristic impedance of the coaxial apparatus is 50 Ω. The power lines are at 50 Ω impedance. There are matched standing waves at resonance.

Figure 32A:
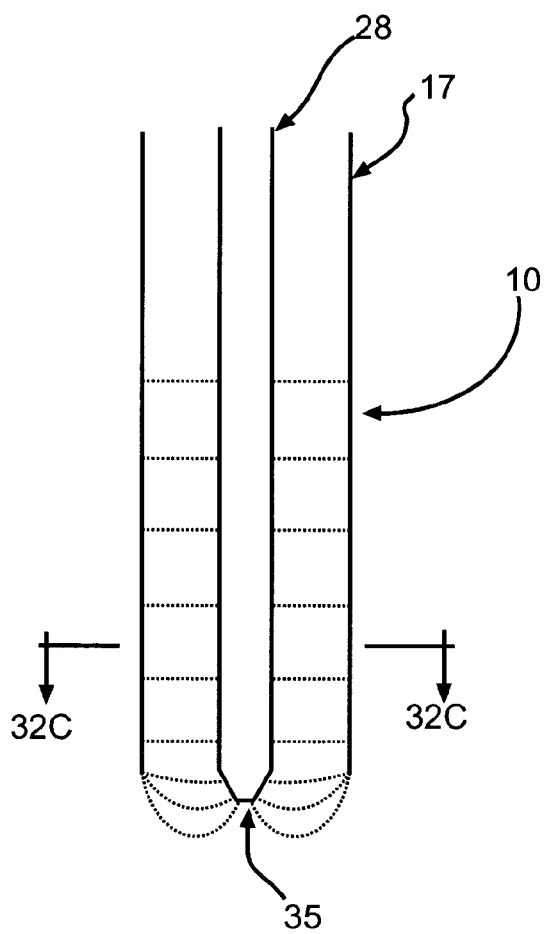
FIG. 32A is a drawing schematically illustrating the microwave torch apparatus 10 when microwave energy is provided which shows the field lines between the inner conductor 28 and outer conductor 17.
Figure 32B:
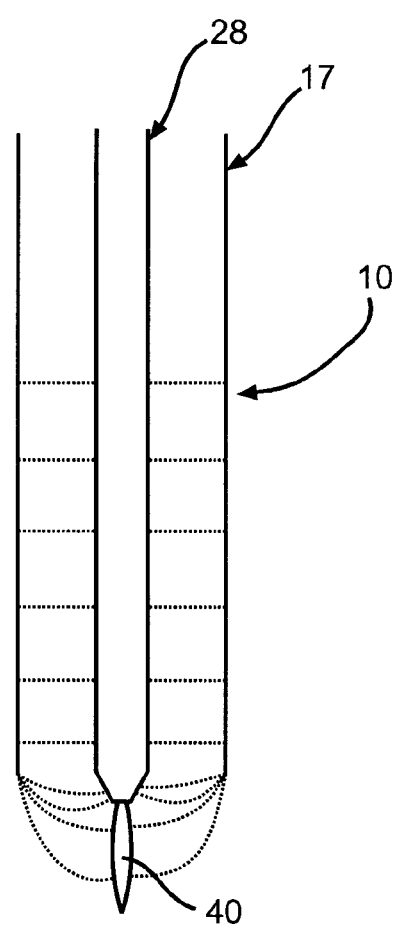
FIG. 32B is a drawing illustrating the apparatus 10 when microwave energy is provided which shows the field lines between the inner conductor 28 and outer conductor 17 during operation generating a plasma discharge 40.
Figure 32C:
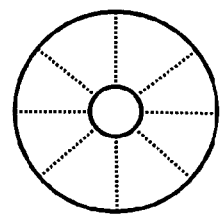
FIG. 32C is a cross-sectional view along line 32C-32C of FIG. 32A showing the field lines between the inner conductor 28 and outer conductor 17.

The behavior of the microwave electric fields in the microwave plasma torch apparatus 10 is shown in FIGS. 32A, 32B and 32C. FIGS. 32A and 32C show the field without the plasma discharge. In the coaxial region between the inner conductor 28 and outer conductor 17 the microwave electric fields are in a radial direction. The microwave energy propagates as a transverse electromagnetic (TEM) wave from the microwave power input coupling structure down to the nozzle 35. The size reduction of the inner conductor at the nozzle end focuses the microwave electric field. This focusing is important for focusing and maintaining the discharge at the end of the inner conductor. The electric field lines that originate at the inner conductor 28 terminate on the outer conductor 17.

When a plasma discharge 40 is present as illustrated in FIG. 32B, the discharge 40 is an electrical conductor, therefore currents can flow in the discharge. The discharge acts, in effect, like an extension of the inner conductor. The microwave electric field lines adjust to extend from both the inner conductor 28 and plasma discharge 40 to the outer conductor 17 as shown in the right portion of FIGS. 32B and 32C. A key feature of the microwave torch apparatus 10 is that the microwave electric fields exist between the inner conductor 28 and the outer conductor 17. The result of this field arrangement is that the plasma discharge can interact with non-conductors, that is the workpiece being processed by the plasma does not need to be an electrical conductor as is necessary with DC torches.

The two adjustments for tuning in the torch apparatus 10 are the position of the tuning stub 21 and the position of the inner conductor 28 as shown in FIG. 8. The position of the inner conductor 28 is determined by manually sliding the inner conductor 28 through the outer portion of the torch consisting of tuning stub 21, stub cap 32, holder 33, nut 24, and outer conductor 17. Friction against the first spacer 11 and inner conductor finger coupling 13 holds the inner conductor 28 at a fixed position. The position of the tuning stub 21 is determined by holder 33. The turning of holder 33 moves the tuning stub 21 via the intermeshed internal thread 33C of the holder 33 and external thread 21A of the tuning stub 21. The first end 33B of holder 33 is held at a fixed vertical position (as oriented in the Figures) between nut 24 and adapter 23. During assembly adapter 23 is held in place by threading it into the outer conductor 17 with first thread 23A of adaptor 23. Then the holder 33 slides on. Next, nut 24 threads on adapter 23 via second thread 23B on the adaptor 23 to secured the holder 33 to outer conductor 17. Due to this, the holder 33 is free to rotate about the axis, but it is held from moving up and down by nut 24 and adapter 23.

EXAMPLE

Figure 5:
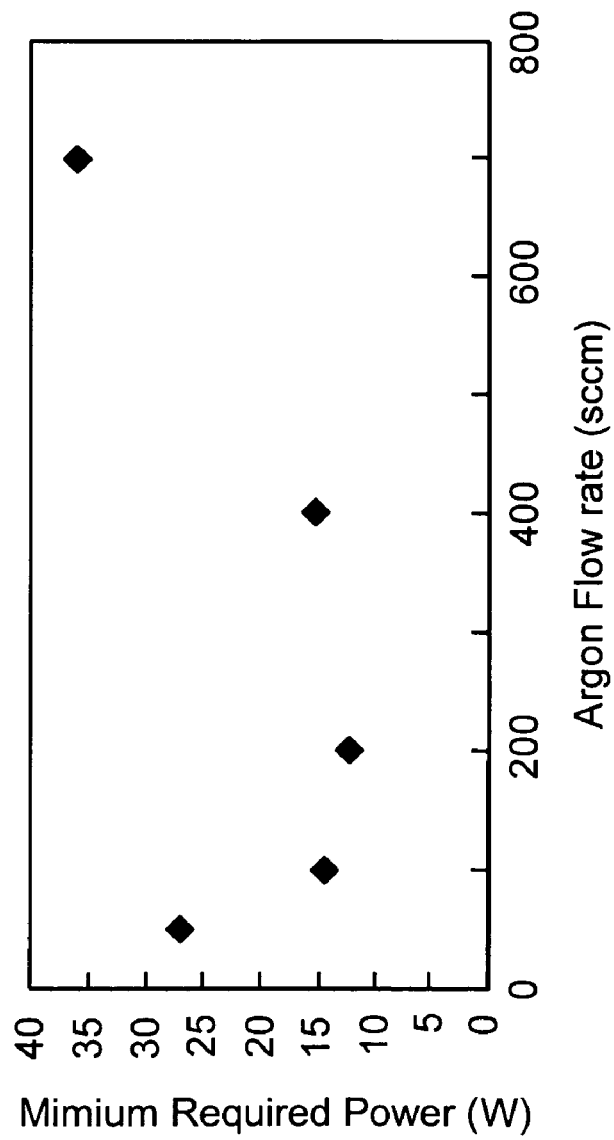
FIG. 5 is a graph showing the power (W) required as a function of flow rate of argon (sccm). The power is that absorbed in the coaxial apparatus 10 and the discharge. The minimum power occurred at 200 sccm for this apparatus 10.

A very useable miniature plasma was created by the microwave plasma torch of the present invention. The minimum required power (W), resulting plasma discharge length (mm) and the power density (W/cm$^3$) of the plasma at the nozzle 35 during operation of the microwave torch apparatus 10 were studied at various argon flow rates (sccm). The plasma discharge 40 as illustrated in FIGS. 3 and 4 is formed when argon is provided at a flow rate of 200 sccm, and the microwave power absorbed in the apparatus 10 when operated in this manner is 15 to 20 W (Watts) as is shown in the graph of FIG. 5. FIG. 5 is a graph showing the power required as a function of the flow rate of argon. The power is that absorbed in the coaxial apparatus 10 and the discharge. The minimum power occurred at 200 sccm for this apparatus 10.

Figure 6:
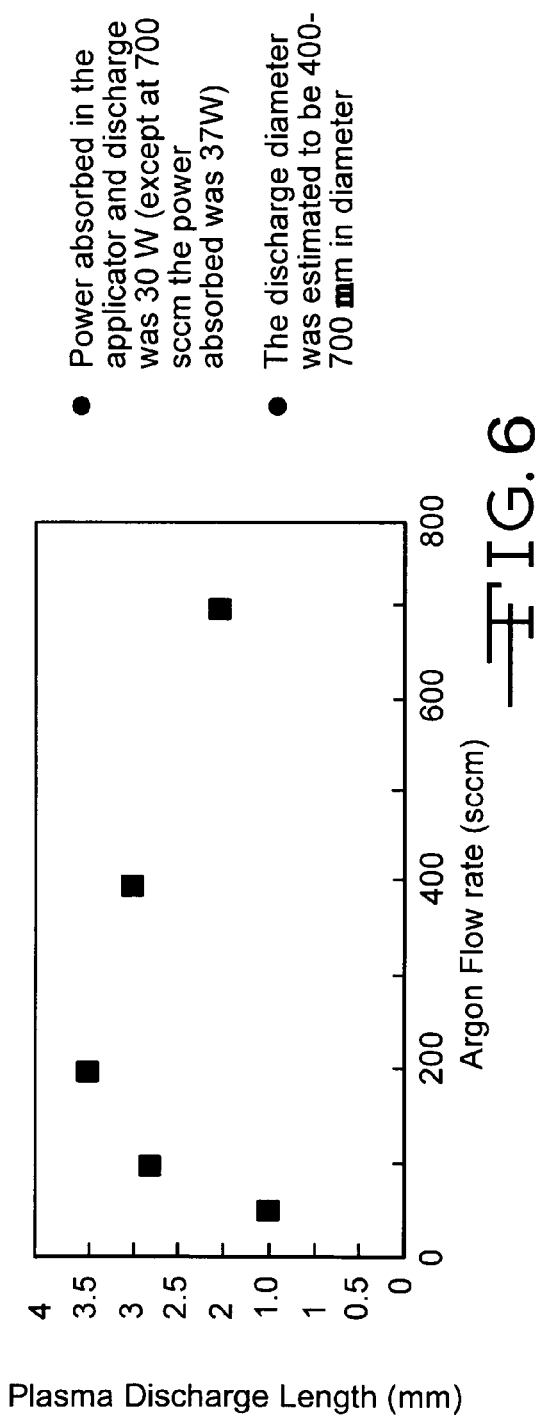
FIG. 6 is a graph showing plasma discharge length in millimeters as a function of argon flow rate (sccm).

The resulting plasma discharge size when operated at 200 sccm is 400-700 µm (micrometer) in diameter and 3-4 mm (millimeter) long. This plasma discharge length is shown as one of the data points in FIG. 6. FIG. 6 is a graph showing plasma discharge length in millimeters as a function of flow rate (sccm). The power absorbed in the apparatus and discharge was 30 W (except at 700 sccm where the power absorbed was 37 watts). The plasma discharge was about 400-700 µm in diameter. As can be seen, there is an optimum flow rate for this apparatus 10 as a function of discharge length of about 200 sccm of argon which coincides with that seen in FIG. 5.

Figure 7:
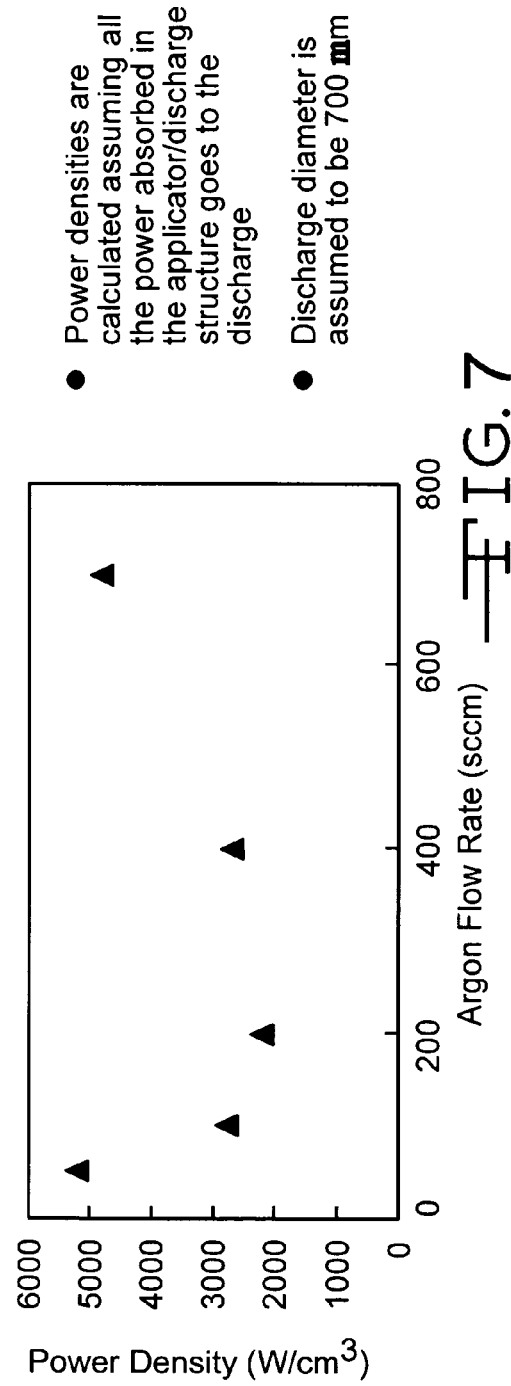
FIG. 7 is a graph showing power density ($W/cm^3$) as a function of argon flow rate (sccm).

FIG. 7 is a graph showing power density (W/cm$^3$) as a function of argon flow rate. Power densities are calculated assuming that all of the power absorbed in the apparatus 10 and discharge goes to the discharge. The discharge diameter is assumed to be about 700 µm for this calculation. The calculated power density is lowest at about 200 sccm which appears to be the optimum for the particular apparatus 10 illustrated in FIG. 1 and FIG. 2.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A microwave plasma torch (discharge) apparatus which comprises:
    (a) an elongate tuneable microwave applicator with opposed ends comprising inner and outer electrically conductive tubular members defining the microwave applicator, the applicator having an inlet port for the microwaves and the inner tubular member defining an inwardly tapering nozzle support having an opening on one of the ends of the applicator;
    (b) a first conduit member mounted through the applicator secured in the opening in the nozzle support for supplying a gas through an orifice isolated at the end at the first conduit member for generating the plasma torch (discharge) produced by the microwaves in the applicator;
    (c) a second conduit member mounted adjacent to the first conduit member defining an outlet near the nozzle end of and within the inner tubular member;
    (d) a finger coupling having latterally projecting fingers encircling and gripping the inner electrically conductive tubular member;
    wherein the second conduit member is operable to supply a cooling fluid throughout the inner tubular member and cool the inner tubular member, the nozzle and the first conduit member while the torch (discharge) is operating;
    wherein the cooling fluid exits out of the applicator through a cooling fluid exit port positioned adjacent the opposed end relative to the nozzle end; and
    wherein the applicator is tunable through a manual adjustment of the inner electrically conductive tubular member that is slidably mounted within the outer electrically conductive tubular member and adjustment of a stub cap that adjusts a sliding short positioned within the outer conductive member.

2. The apparatus of claim 1 wherein the orifice in the first conduit member has a diameter of less than about 1 mm.

3. The apparatus of claim 1 wherein the applicator is tuneable by a sliding short between the tubular members.

4. The apparatus of claim 1 wherein the inner tubular member is slidably mounted through a support inside the outer tubular member.

5. The apparatus of claim 1 wherein the inner tubular member is supported inside the outer tubular member by non-electrically conductive spacers.

6. The apparatus of any one of claims 1, 2, 3, 4, or 5 wherein the outer tubular member has an inner diameter of about 1.27 cm or less and the inner tubular member has an outside diameter of less than about 0.8 cm and the first and second conduit members are each less than about 0.25 cm in outside diameter.

7. The apparatus of any one of claims 1, 2, 3, 4, or 5 wherein the torch (plasma) formed by the plasma at the orifice has a diameter of less than about 1 mm.

8. The apparatus of claim 1 wherein the microwave energy inlet port is provided intermediate the ends of the applicator.

9. The apparatus of claim 1 wherein first conduit member is mounted through the applicator at the end opposite the end of the nozzle support.

10. The apparatus of claim 1, wherein the cooling fluid is water.

11. The apparatus of claim 1, wherein the manual adjustment of the inner conductive member and the adjustment of the sliding short are both moveable axially along a longitudinal axis defined by the elongated applicator.

12. The apparatus of claim 1, wherein the laterally projecting fingers of the finger coupling are adapted to provide friction to hold the inner electrically conductive tubular in a fixed position.

13. The apparatus of claim 12, further comprising a rod extending through the microwave inlet port mounted with respect to the finger coupling and adapted to allow for microwaves to propagate through a cavity formed between the inner and outer e electrically conductive tubular members.

14. The apparatus of claim 13, further including a second spacer positioned within the microwave inlet port encircled around the rod, wherein the second spacer is adapted to hold the rod in a fixed position.

15. The apparatus of claim 14, wherein the microwave inlet port is provided intermediate the ends of the applicator and is connected to a cone shaped taper adapted to allow for delivery of microwaves to the cavity formed between the inner and outer electrically conductive tubular members.

16. The apparatus of claim 15, further comprising a core member mounted within the cone shaped taper and connected to the rod to allow for microwaves to propagate from a microwave delivery source to the cavity formed between the inner and outer electrically conductive tubular members.

17. The apparatus of claim 16, wherein the core member is constructed from brass.

18. The apparatus of claim 16, wherein the core member and the rod are threadedly connected with respect to each other.

19. The apparatus of claim 1, wherein the sliding short is comprised of a tuning stub slidably mounted between inner and outer electrically conductive tubular members for adjusting a microwave standing wave delivered through the microwave inlet port to couple microwave energy to the plasma discharge, wherein the tuning stub is mounted with respect to the inner and outer electrically conductive tubular members by an adapter and is slidably adjusted by a stub cap positioned near the opposite end of the opposed ends with respect to the nozzle end.

\* \* \* \* \*

UNITED STATES PATENT AND TRADEMARK OFFICE
CERTIFICATE OF CORRECTION

PATENT NO.         : 7,442,271 B2
APPLICATION NO.    : 11/100253
DATED              : October 28, 2008
INVENTOR(S)        : Jes Asmussen et al.

Page 1 of 1

It is certified that error appears in the above-identified patent and that said Letters Patent is hereby corrected as shown below:

Column 13, line 1, "0.8 cm" should be --0.5 cm--.

Column 13, line 26, "outer e electrically" should be --outer electrically--.

Signed and Sealed this

Seventeenth Day of February, 2009

JOHN DOLL
*Acting Director of the United States Patent and Trademark Office*